United States Patent [19]

Herr et al.

[11] Patent Number: 4,475,189

[45] Date of Patent: Oct. 2, 1984

[54] AUTOMATIC INTERACTIVE CONFERENCE ARRANGEMENT

[75] Inventors: Diane E. Herr, Warrenville; Reinhard Metz, Oswego, both of Ill.; Laddie E. Suk, Readington, N.J.; Paul R. Wiley, Naperville; David F. Winchell, Glen Ellen, both of Ill.

[73] Assignee: AT&T Bell Laboratories, Murray Hill, N.J.

[21] Appl. No.: 382,602

[22] Filed: May 27, 1982

[51] Int. Cl.³ .......................... H04J 3/12; H04M 3/56
[52] U.S. Cl. .................................. 370/62; 179/2 DP; 179/18 BC
[58] Field of Search ............. 179/18 BC, 2 DP, 18 B; 370/62, 42

[56] References Cited

U.S. PATENT DOCUMENTS

| | | | |
|---|---|---|---|
| 3,519,744 | 7/1970 | Dorros et al. | 179/2 R |
| 3,544,727 | 12/1970 | Sloan et al. | 179/18 BC |
| 3,678,207 | 7/1972 | Schon | 179/18 BC |
| 4,027,098 | 5/1977 | Reisch et al. | 178/3 |
| 4,054,756 | 10/1977 | Comella et al. | 179/18 B |
| 4,281,410 | 7/1981 | Agricola et al. | 370/62 X |
| 4,317,960 | 3/1982 | Johnson et al. | 179/18 BC |
| 4,342,111 | 7/1982 | Busson | 370/62 |
| 4,371,752 | 2/1983 | Matthews et al. | 179/7.1 TP |
| 4,389,720 | 6/1983 | Baxter et al. | 370/62 |
| 4,397,030 | 8/1983 | Becker et al. | 375/36 |

Primary Examiner—Thomas W. Brown
Attorney, Agent, or Firm—C. H. Davis

[57] ABSTRACT

A network services complex having an audio conference bridge, a data conference bridge, a tone receiver and a data store announcement system is disclosed. The complex is connected to a telephone network via a host toll switching center. Customers dialing over the network using a keyset can selectively establish audio-only, data-only and combined audio/data conferences. Announcements from the data store prompt the customer in the use of the arrangement and request the user to reenter information when the customer makes an error. Should the customer make too many errors, an operator is summoned.

10 Claims, 21 Drawing Figures

DATA LINK PROCESSOR 601

MAIN PROCESSOR SYSTEM

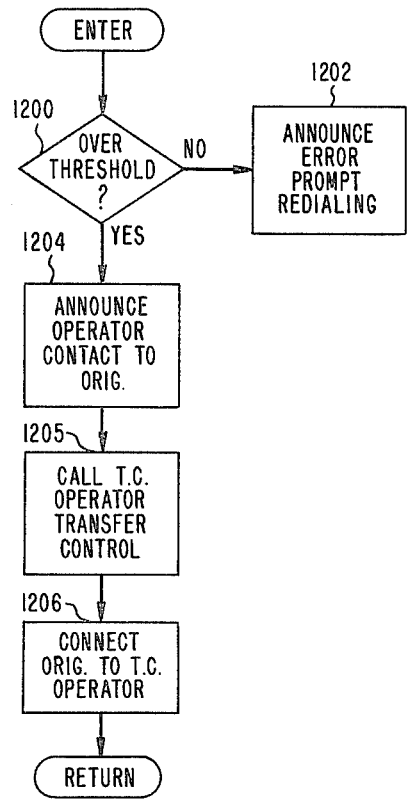
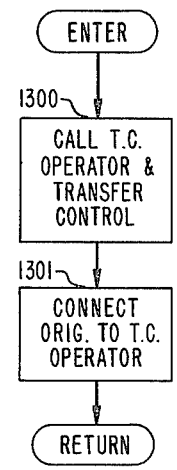
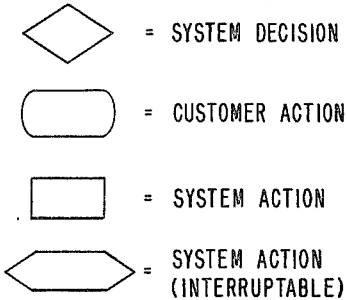
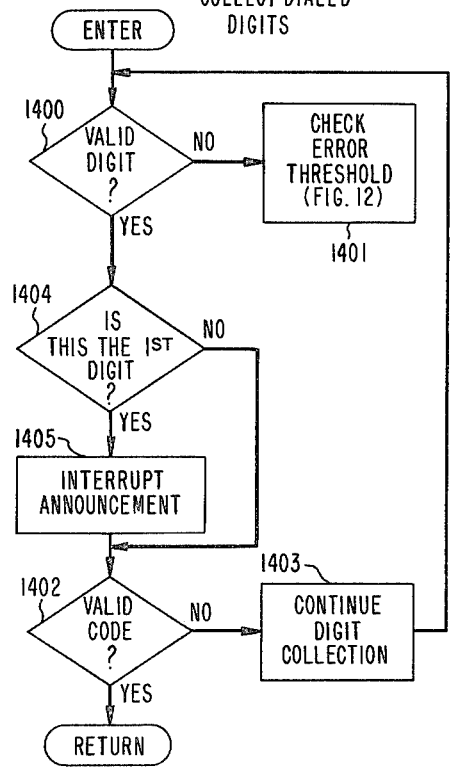

AUTOMATIC INTERACTIVE CONFERENCE ARRANGEMENT

TECHNICAL FIELD

This invention relates to communication systems and particularly to conferencing arrangements in a telecommunications network.

In a more particular aspect, this invention relates to automatic dial-up conferencing arrangements whereby a customer can originate and control a multiparty conference for voice and data terminals. In a still more particular aspect, this invention relates to combined voice/data conferencing arrangements which are controlled by the conference originator under the guidance of voice prompts from a processor controlled announcement system.

BACKGROUND OF THE INVENTION

Communication networks have become a valuable measure for use in exchanging information among geographically separated customers. With increasing costs for travel and lodging, conferencing arrangements offer an alternative to face-to-face meetings by allowing all conferees to participate in routine meetings which can be called on short notice.

While many teleconferencing arrangements have been available in the past, they lack certain features found in the present arrangement.

In one form of prior art conference arrangement, the originator of the conference must call an operator and give the operator the telephone numbers of all conferees and the time that the conference is to be held. If changes are to be made during the conference, such as adding another party, the operator must be signaled and must interrupt the conference while establishing a connection to the new conferee.

While these arrangements are suitable for their intended purpose, they require the services of an operator to establish and supervise the conference in order to ascertain if any changes are to be made. This puts an additional work load on the operator's position, and the operator spends an inordinate amount of time dialing each conferee and waiting for each conferee to answer. Thus, to alleviate operator position work load and render more privacy to a conference service, it is desirable to automate many of the functions associated with conference calls.

Automatic conference arrangements are also known in the prior art. In certain automatic group call arrangements, the conference originator can dial a preassigned code to summon the group of conferees designated by the code. Also, in typical dial-up conferences, the originator can dial each conferee in a manner similar to the operator's procedure described above.

Of course, the group call arrangement lacks the flexibility of permitting parties to be added to the conference. On the other hand, the dial-up conference arrangement may be troublesome for the originator particularly when complicated dialing procedures are involved to establish a large conference or to implement numerous special service features such as selectively conferencing data terminals which may or may not be associated with the customers participating in an audio conference.

SUMMARY OF THE INVENTION

The foregoing problem is solved and a technical advance is achieved by a dial-up audio/data conference arrangement which automatically prompts the originator as to the proper procedures for implementing the conference service.

More specifically, the invention is embodied in a network services complex comprising an audio bridge system, a data bridge system, a data store announcement system, and a tone receiver system. Each of the above systems is processor controlled, and a main processor system oversees the functioning of the entire complex.

In operation, a customer initiates a conference by dialing a special conference code. The call is routed to the network services complex and the network services complex responds by prompting the caller with instructions on what action must be taken next. The prompts are audio messages composed and generated by the data store announcement system at the request of the main processor system for playback to the conference originator.

Thus, the customer dynamically interacts with the network services complex by responding to the prompts using the keyset of his telephone station. In accordance with a feature of the invention, the system will recognize invalid responses from the originator and automatically prompts the originator with new messages so that the user can take corrective action. According to a further feature of the invention, when the network services complex detects that the user is making too many mistakes and may get frustrated, an operator is automatically summoned to assist the user. The operator is then automatically apprised of the nature of the originator's difficulty so that the operator may render the proper assistance to the conference originator. In accordance with still another feature of the invention, the conference originator can selectively establish conference channels to telephone stations and data terminals, independently, so that customers equipped with audio and data capabilities can converse with each other and also exchange graphic information.

BRIEF DESCRIPTION OF THE DRAWINGS

FIGS. 12-20 show a flow diagram of the overall operation of the system; and

FIG. 21 shows the legend of the symbols used in the flow diagram.

GENERAL SYSTEM DESCRIPTION

Figure 1:
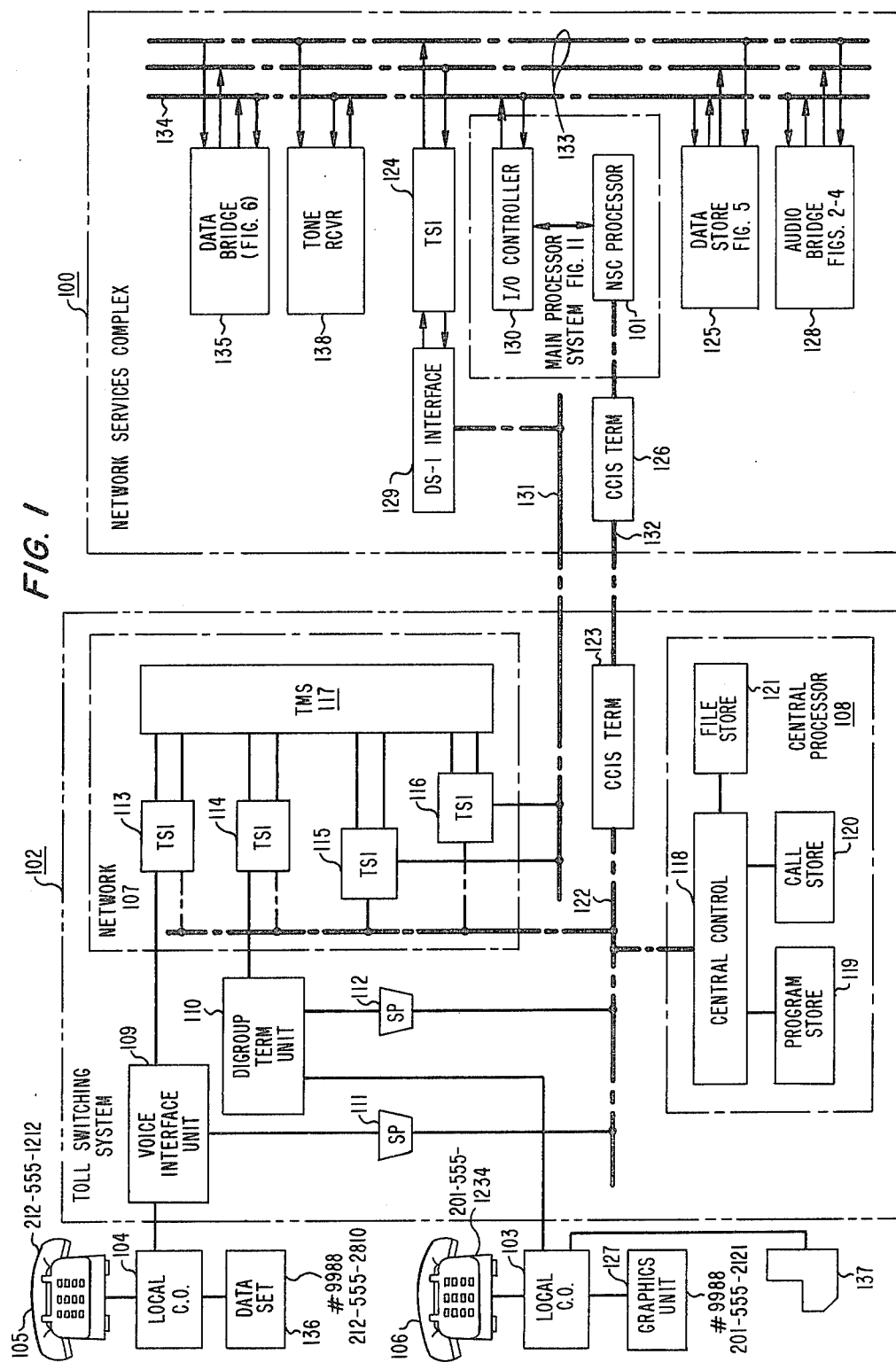
FIG. 1 shows a block diagram of a telephone network having a toll switching system equipped with a network services complex for providing conference services.

The general organization of a system employing the invention is illustrated in the block diagram of FIG. 1 which shows a typical communications network having a toll switching system 102 which serves local telephone central offices 103 and 104. Central offices 103 and 104 contain the switching apparatus for providing telephone service to customer stations 105 and 106, respectively and data service to data set 136 and graphics unit 127. Connected to switching system 102 is a network services complex 100 for providing special services such as audio/data conferencing.

Network services complex 100 includes NSC processor 101, data store system 125, input/output controller 130, audio bridge system 128, data bridge system 135, a plurality of tone receivers such as 138, and other units. As will be described in more detail below, one of the functions of complex 100 is to provide audio/data conferencing with announcements and instructions to customers over the telephone network via the toll and local switching offices.

Toll switching system 102, as depicted in FIG. 1, is a typical electronic switching system, such as, the No. 4 ESS which is manufactured by the Western Electric Company, Incorporated. This switching system is described in detail in the *Bell System Technical Journal,* Vol. 56, No. 7, September 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

TMS 117 is a two-stage switch array comprised of solid state crosspoints which provide a multiplicity of unidirectional paths between its input and output. Each network connection through TMS 117 is made in terms of a pair of unidirectional paths in one of the 128 time slots sharing the paths on a repeating basis at an [KHz rate. The switches are controlled by information contained in time slot memories and this information is placed in the memory by the processor under the control of call processing programs.

The TSI units 113–116 provide the initial time-space and final space-time stages of the network 107. The time slot interchanger receives incoming pulse code modulated samples over analog and digital facilities in a DS-120 format where 120, 8-bit PCM channels are multiplexed with 8 maintenance channels to form a 128 time slot frame. The receiving portion of the time slot interchange buffers the incoming links to allow synchronization of the data with the network timing and performs the initial time-space switching before transmitting data to the TMS. After passing through the TMS, the data is returned to the same TSI or another TSI where the final space-to-time conversion is performed. The TSI then reloads the data onto outgoing DS-120 links where it is transmitted to the appropriate analog or digital facility.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 and operator position 137 are connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 is a directed processor under the control of central control 118 and provides the scan, distribute and digit reception tasks for analog trunks. Signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. Central processor 108 is a data processing facility and can functionally be divided into a central control 118, program store 119, call store 120, file store 121 and other apparatus that has not been shown to simplify the drawing. A typical processor suitable for use in the illustrative toll switching system is described in the *Bell System Technical Journal,* Vol. 56, No. 2, February 1977.

The program store 119 contains programs that are normally resident in the system while call store 120 contains transient data relating to calls in progress. File store 121 is a source of office data and programs, and store 121 will retain the data in the event of a power or hardware failure. The file store is also used to replenish program stores that become faulty and lose their data.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal,* Vol. 57, No. 2, dated February 1978, and is represented herein by CCIS blocks 123 and 126 and data link 132.

Coupled to the toll switching system is the network services complex 100 comprising a main processor system including NSC processor 101 and input/output controller 130, a data bridge system 135, an audio bridge system 128, CCIS terminal 126, DS-1 interface 129, time slot interchange 124, data store announcement system 125 and a plurality of tone receivers, such as 138. Network services complex 100 can also include other units such as additional audio conferencing bridges, speech recognition systems, data processing units, etc.

It is intended that network services complex 100 function with many different types of switching systems to provide several special services in addition to those mentioned above. As such, complex 100 has been designed to connect to a switching system via conventional interoffice trunks 131 and a CCIS data link 132. The interoffice trunks 131 serving complex 100 are digital facilities similar to the trunks between toll office 102 and local office 103 as described above and the data link 132 and its CCIS terminals are similar to those described in the 1978 *Bell System Technical Journal* cited above. Although these terminals are referred to as CCIS terminals, it is not essential that they be integrated in the CCIS signaling system of the network.

The network services complex is modularly designed to allow for various service units to be added. All units are interconnected over a data bus 133 and a control bus 134. The control bus is used by the NSC processor 101 to communicate control, status and error information with the various units in the complex. Program associated data, billing data, etc., which is distinguished from customer data to be conferenced is also transmitted over control bus 134. Data bus 133 consists of a transmit bus and a receive bus and each bus is a 256 time slot, time-multiplexed PCM data bus.

Interface 129 connects the T1 lines from toll switching system 102 to time slot interchange unit 124 which under the direction of processor 101 switches any time slot in the receive T1 bus or the transmit portion of data bus 133 with any time slot on the T1 transmit bus or the receive portion of data bus 133. Thus, the interface 129, time slot interchange 124, and bus 133 provide the path for the exchange of voice, data, announcements, and inband signaling between the toll switching system 102 and units of the network services complex.

The network services complex 100 is controlled by NSC processor 101 which performs or initiates all call processing, maintenance, fault recovery, diagnostics and audits for the entire complex. Processor 101 also interfaces with CCIS terminal 126 to transmit and receive messages from the host toll switching system 102.

As mentioned above, the network services complex can be equipped to furnish many services. For purposes of illustration, let it be assumed that the complex is equipped for dial-up audio/data conferencing with voice prompting. Accordingly, the complex comprises an audio bridge system 128 which is used for combining the digital voice samples of speakers on a conference for distribution to other participants of the conference. Data bridge system 135, on the other hand, receives data from each conferee's data terminal and distributes the data to the other conferees at the correct speed, in the proper format, etc. The term, data, when used with respect to information transmitted by a customer, is meant to include digital representations of video signals, facsimile, signals from devices such as electronic chalk boards, etc., which is separate from the voice and tone signals transmitted by the customer.

Network services complex 100 also includes a data store system 125 for furnishing announcements to instruct the customers in the use of the special services, and a tone receiver 138 which receives the tone signals representing digits generated by the customer in establishing and controlling a conference.

The control interface between the network services complex systems and the toll switching system 102 is via a main processor system including NSC processor 101, input/output controller 130, and CCIS type terminal 126. It is via this path that orders are exchanged between the network services complex and the toll switching system.

DS-1 interface 129 in this embodiment provides an interface for up to five T1 lines (120 channels or time slots) which terminate on time slot interchange unit 124. The time slot interchange unit in turn, functions to switch these circuits with 256 time slots on time multiplex data bus 133 to interconnect the channels with the various service units in network services complex. Thus, voice, data, and signaling information incoming over the toll telephone network from a conferee is forwarded via interface 129, and time slot interchange 124 to the audio and data bridges for conferencing or to the tone receiver for digit detection and collection while announcements and tones from data store system 125 and conference data from the bridges are transmitted back via the time slot interchange over the toll network to the conferees.

Conference calls are established by using a conventional telephone station and dialing a special conference code assigned to the conferencing service. To facilitate end-to-end signaling, it will be assumed that the customer station is equipped with a keyset for generating dual-tone multifrequency signals.

The telephone call is handled in the usual manner through the network and routed according to the dialed digits to the nearest toll switching system equipped for conferencing, such as system 102. Toll switching system 102 accesses the network services complex by transmitting a message over data link 132 to CCIS terminal 126 and ascertains if conferencing facilities are available. If facilities are available, the call is handed off to the network services complex by extending the conference originator's talking path via a channel in T1 carrier link 131, time slot interchange 124 and over the time multiplex data bus.

Recognizing a request for a conference, NSC processor 101 requests an identification of the calling line and transmits an order over bus 134 to data store system 125 ordering a particular message prompt to be played to the customer. This prompt would advise the customer that he/she is connected to a conference facility and request the customer to dial certain codes to indicate whether this is an audio only, data only, or a combined audio/data conference. The prompt would also ask the originator how many parties will be included in the conference.

Data store system 125 responds to the order from processor 101 by loading the appropriate messages in a playback buffer and transmitting the messages over the time multiplex data bus 133 and time slot interchange 124 to the conference originator. Processor 101 also causes a tone receiver 138 to be connected in a different time slot over the time multiplex data bus to the conference originator. The receiver monitors the originator's line for the reception of tones from the caller.

The customer now dials (keys in) the codes satisfying the requirements for his/her conference. Tone receiver 138 detects each digit and forwards it to processor 101. Assuming that this is a combined audio/data conference, processor 101 reserves audio ports in bridge system 128, data ports in bridge system 135, and then sends an order to the data store system 125 causing the next message prompt to be transmitted to the originator.

This prompt will tell the conference originator the code that should be dialed followed by the telephone number of the conferee to be added to the conference.

As each telephone number is received via the tone receiver 138 and forwarded to processor 101, processor 101 initiates a call over its data link 132 to toll switching system 102 requesting that the toll switching system establish a call to the designated conferee and connect that conferee to a channel selected in T1 link 131.

As each leg is established under the direction of processor 101 and the called conferee answers, the conference originator can converse with the conferee announcing that he/she is about to be added to the conference. Similar legs are established from data bridge system 135 to the data terminals of each conferee.

In accordance with a feature of the invention, if the conference originator does not respond with the correct code when prompted by the network services complex, additional prompts will be supplied to assist the originator in completing the call in the correct manner. Should the originator make too many errors in dialing the appropriate calls for the conferee, processor 101 will signal the toll switching system 102 to establish a communication path to the operator at position 137. The operator is then interconnected with the originator of the conference. When the operator is summoned, signals will be transmitted to the operator indicating the nature of the problem the originator is experiencing.

DETAILED DESCRIPTION

The invention can better be understood by a more detailed description of each of the major elements of the apparatus as shown in FIGS. 2-11 followed by a description of the sequence of operation of the equipment with respect to the flow diagrams in FIGS. 12-21.

1. Main Processor System

Figure 11:
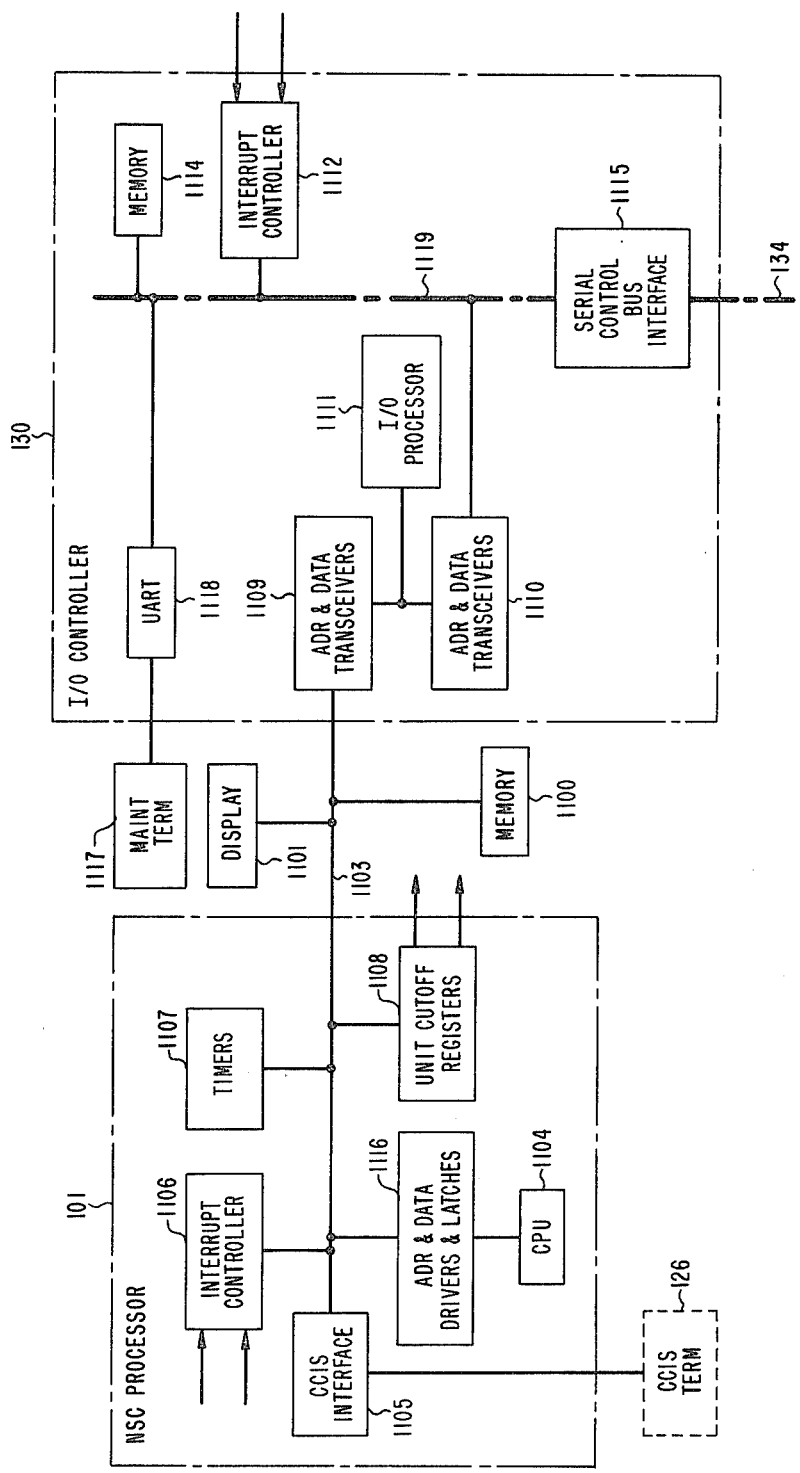
FIG. 11 shows the main processor system of the network services complex.

The main processor system for the network services complex is shown in more detail in FIG. 11. The main processor system comprises NSC processor 101, memory 1100, input/output controller 130, and display 1101 which are interconnected over system bus 1103. The main processor system is a distributed processor which is responsible for all call processing, maintenance, fault recovery, certain diagnostics and audits for the network services complex as a whole. The main processor system also keeps track of all system resources such as what ports are assigned to a particular conference, the status of all ports and receivers, the identification of available announcements, etc.

Communication with the toll switching system 102 is via CCIS terminal 126 which accesses processor 101 via a direct memory access channel, and processor 101 distributes orders to and receives replies from the peripheral service units (such as the data bridge, the audio bridge, etc.) via input/output controller 130 which acts as a direct memory access controller for the processor. Using a shared area of memory 1100, controller 130 transfers messages between the peripheral service units and processor 101.

The units within the main processor system communicate via system bus 1103 in a master-slave relationship. Central processing unit (CPU) 1104, I/O processor 1111, and a memory refresh controller (not shown), acts as masters with the other units acting as slaves. Contention between bus masters is resolved by a bus arbiter arrangement in a well-known manner.

The NSC processor 101 comprises CPU 1104, interrupt controller 1106, CCIS interface 1105, timer 1107, and unit cut off registers 1108.

Interrupt controller 1106 responds to signals from equipment such as timer 1107 and controller 130. It will be noted that CCIS interface 1105 resides on the system bus to permit any master on the bus to access a random access memory (RAM) which resides in the terminal 126.

As mentioned above, the serial control bus 134 interconnects the main processor system with the peripheral service units for control information and time multiplex data bus 133 interconnects the units for data flow. These units can be disabled and forced off the bus by unit cut off registers 1108 under the direction of CPU 1104.

The input/output controller 130 acts as a direct memory access controller for memory 1100 and all service unit operations. In addition, it permits maintenance personnel to access the system via a maintenance terminal 1177. I/O processor 1111 accesses its own resident bus 1119 via address and data transceivers 1110, and it accesses the system bus 1103 via address and data transceivers 1109.

I/O processor 1111 has its own memory 1114 for program storage and its own interrupt controller 1112. It is via interrupt controller 1112 that the peripheral units such as the audio bridge, data bridge, etc., gain access to main processor system of the network services complex.

All communication of the control information between the main processor system and the other units of the complex is via serial control bus interface 1115 and control bus 134. The main processor system units acts as a master on the control bus with the audio bridge system, data bridge system, data store system tone receivers, time slot interchange unit, etc. acting as slaves. Messages from the main processor system are formatted with a destination address of the peripheral system to which the message is directed, followed by an operation code which specifies the function of the message and a data field containing the contents of the message. If a peripheral unit such as the data bridge wishes to utilize the control bus 134, it signals over a dedicated interrupt lead to interrupt controller 1112, and the main processor system can grant control of the bus with the next message it sends over the bus.

2. Data Store System

As mentioned above, data store 125 is provided to furnish announcements over the telephone network to instruct customers in the use of the special services furnished by the network services complex. In general, data store 125 receives requests for announcements in the form of orders from NSC processor 101 over control bus 134, acknowledges the requests and plays the announcement back over bus 133 in a time slot designated by processor 101.

Figure 5:
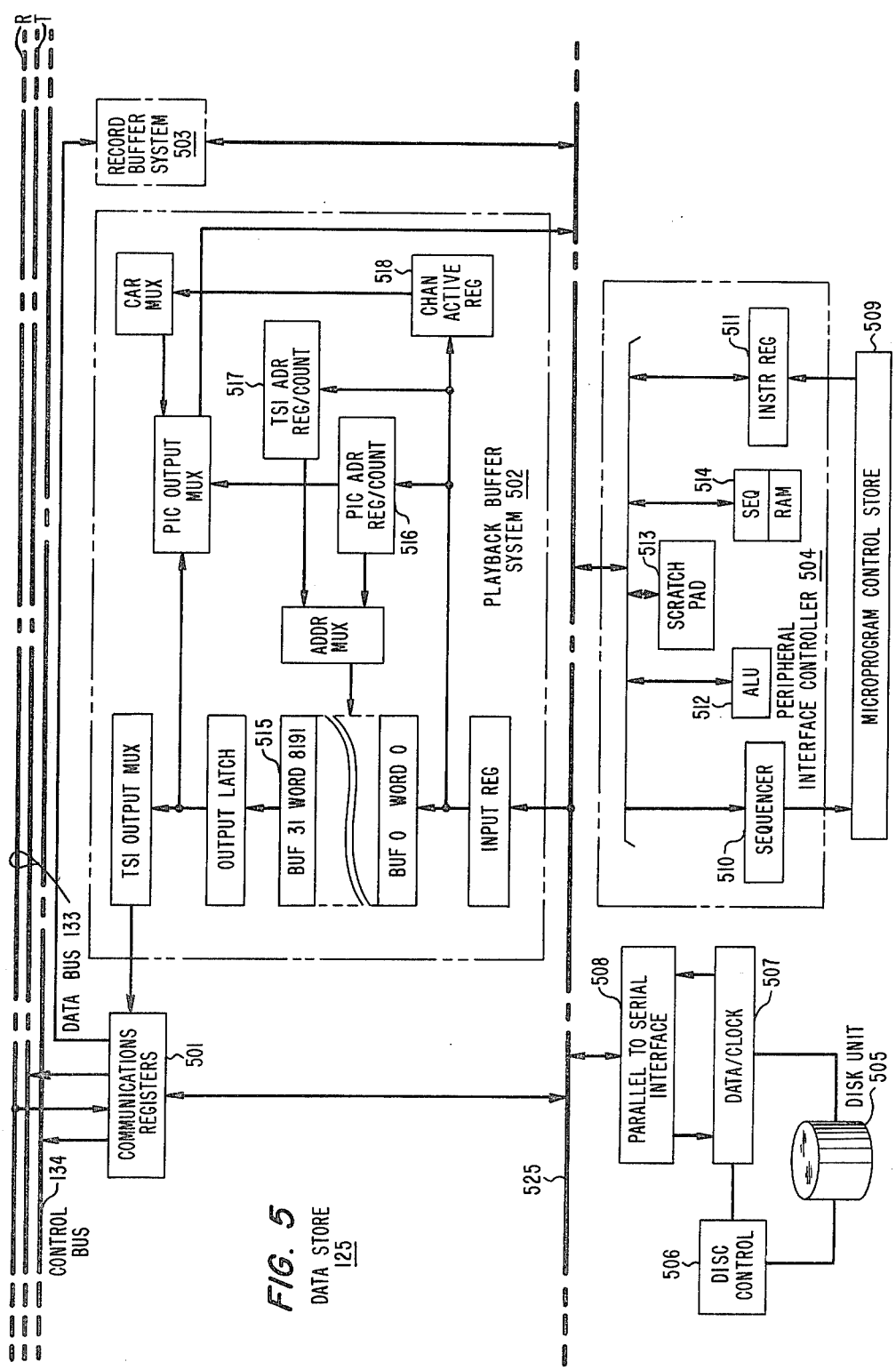
FIG. 5 shows a more detailed block diagram of the data store used for storing announcements for the network services complex.

The apparatus of data store 125, which will now be described, is more fully disclosed in FIG. 5. As shown in FIG. 5, data store 125 is a processor controlled facility comprising a plurality of communications registers 501, playback and record buffer systems 502 and 503, peripheral interface controller 504 and disc unit 505 with its associated control, data/clock and parallel/serial interface units 506–508. Audio information transmitted from time slot interchange 124 (shown in FIG. 1) via 8-bit serial/parallel multiplex bus 133R is received in record buffer system 503 in encoded PCM format. Similarly, audio information is played back via playback buffer system 502 and transmit bus 133T to time slot interchange 124. Data transfer occurs at a 64Kb/s rate per channel.

Orders received from NSC processor 101 and replies generated by peripheral interface controller 504 are transmitted over control bus 134 at a 2Mb/s rate.

Orders for the play back of various messages which are stored in disc unit 505 are executed by reading from sectors of the disc 505 into a plurality of the playback buffers of the playback buffer system. In this embodiment, each playback buffer can contain up to two seconds of information for each playback channel and the data store as a whole can accommodate up to 32 channels of play back, with seven of these allocated to playing repetitively, two-second announcements and signals such as a tone. The 32nd channel is used for internal maintenance.

Each playback channel of the data store will be assigned a time slot on bus 133T and of course, a plurality of data stores, such as 125, can be added to the bus to increase the overall voice storage and playback channel capacity of the network services complex. Most of the intelligent logic for the data store resides in the peripheral interface controller 504. Controller 504 is a high-speed sequencer driven controller which performs all common arithmetic and logic functions for control purposes within the data store. Controller 504 is driven by a firmware program contained in the microprocessor control store 509. Controller 504 communicates with other equipment in the data store such as communications registers 501, buffer systems 502 and 503 and the disc unit via internal bus 525.

Periodically, sequencer 510 in controller 504 generates an address to read a word from store 509. This word is read into instruction register 511 in the controller which executes the instruction. Controller 504 also contains interrupt control logic, a scratchpad register 513 and a random access memory 514.

Announcement storage is provided by moving head disc unit 505. In this illustrative embodiment, the disc unit contains ten platters each having two faces. Nineteen of the faces are used for voice storage and one contains clock information. Each disc face is divided into annular tracks of which 332 are used for message storage and 32 are used for data storage. The tracks are divided into 32 sectors and each sector holds 512 bytes of data. The information stored in all sectors of one track is equivalent to two seconds of recorded material. The annular tracks of all nineteen voice storage faces are aligned one above the other and when taken together form a cylinder.

Of the cylinders dedicated to voice storage, the outermost cylinders including tracks 0–13 are reserved for half-second phrases which are repeated four times in each track while the adjacent cylinders including tracks 14–332 contain two one-second phrases per track. Innermost and adjacent to the voice storage cylinders are cylinders for storing data, such as, billing information, RAM based firmware backup, etc.

Returning now to FIG. 5, it can be seen that the communications registers 501 are provided to interface the peripheral interface controller 504 with the control bus 134, and hence, the other units including NSC processor 101 of the network services complex 100. Communications registers 501 included error source registers that can be directly read from and written into by processor 101 so that processor 101 can be apprised of the condition of the peripheral units on the bus. A status register is also provided and the status register can be directly read from peripheral interface controller 504 or read and written from processor 101. Communications registers 501 also includes an input register and an output register for moving orders between peripheral interface controller 504 and the network services complex processor 101, and apparatus is also provided to perform error checking on all data moved on the control bus 134 and the transmit and receive buses 133T and 133R.

The playback buffer system 502 performs the basic function of processing various data going from parallel/serial disc interface 508 to the time slot interchange 124 of the network services complex. Serial data on the disc is read from the unit 505 and converted to parallel format and stored in a RAM buffer in interface 508. This parallel data is then transferred on a word-by-word basis to the dynamic RAM 515 in playback buffer system 502 under control of the peripheral interface controller 504. Each word consists of two bytes of data plus a parity bit for each byte. The playback buffer system stores data for a particular playback channel in a playback buffer in RAM 515 on an interleaved basis with 31 other playback buffers each of which is associated with a corresponding playback channel. Only 24 channels will be used, however, for playback in this embodiment.

Peripheral interface controller 504 uses address register 516 to write and read from RAM 515. Consecutive reads and writes by controller 504 are done internally to the playback buffer system 502 by accessing the memory on an interleaved basis with the next memory location being 32 locations higher in memory.

Information is read out of RAM 515 over the transmit bus 133T under control of TSI address register/counter 517. This register follows the time slot count and can be read from but not written into by controller 504. In normal operation, peripheral interface controller 504 would "O" register 517 a start-up. After start-up, register 517 would automatically increment through the entire memory in consecutive order to read a word of data for each playback channel for every frame.

Channel activity register 518 shown in FIG. 5 is used to designate those channels that are active and those channels over which an idle code is to be transmitted.

The record buffer system 503 provides one method for writing voice data onto the disc. In addition, the RAM in the record buffer system serves as the primary memory store, holding the announcement mapping of the disc, link lists, etc.

During the recording procedure, PCM voice data over a T1 channel is routed over a specified time slot on receive bus 133R to the RAM in record buffer system 503. Peripheral interface controller 504 accesses the record buffer system on a time shared basis with TSI 124.

For each separate announcement to be recorded, an order will be sent over control bus 134 from NSC processor 101 to peripheral interface controller 504 that an announcement of n seconds is being sent over receive bus 133R in the time slot designated for the record channel.

In carrying out the functions of storing and playing back announcements, peripheral interface controller 504 maintains a plurality of tables in memory. These tables will be referred to in describing the operation of the system and a brief description of some of the more pertinent tables will be given now.

The PLAYBACK INPUT QUEUE is a table for holding all new orders for the playback of announcements that are received from NSC processor 101. The table contains the announcement number and an indication of whether it is a half-second or one-second announcement. In this illustrative embodiment, 32 locations are assigned in this table for each of the 24 playback buffers.

The THREAD table holds the announcement numbers for all announcements to be played for one playback buffer. There are 32 words per buffer in the THREAD table in this embodiment, and each word contains the announcement number and an indication of whether it is a half-second or one-second announcement plus various status flags.

There are two FORWARD tables. One, is for half-second announcements, and the other for one-second announcements. Each pair of words in the FORWARD table holds the address of the disc segment to be read and the address of the playback buffer to receive the data.

A BACKWARD table is also provided. The BACKWARD table is similar to the ONE SECOND FORWARD table except that it is ordered in the reverse direction.

Peripheral interface controller 504 also maintains a BUFFER STATUS table to indicate the status of each playback buffer. Each buffer can assume one of four states namely: idle, playback, last buffer fill and final second of playback.

In playing back announcements which are used to prompt the customer in the use of the network services complex, the main processor system sends an order over control bus 134 requesting a particular announcement be played in a particular time slot on time multiplex data bus 133. At the same time, processor 101 causes the information on that time slot to be transmitted via TSI 124 over a time slot associated with the originator, each of the conferees or whoever is to receive the announcement.

In response to an order from processor 101, data store functions autonomously to load the proper announcements from disc unit 505 into the playback buffer associated with the time slot designated by processor 101 and peripheral interface controller 504 reports back to NSC processor 101 that the announcement has been played back as ordered.

While the term "announcement" has been used herein with respect to data store 125, it will be understood that the data store can also have various tones stored therein for playback over the network.

3. Audio Bridge System

Figure 2:
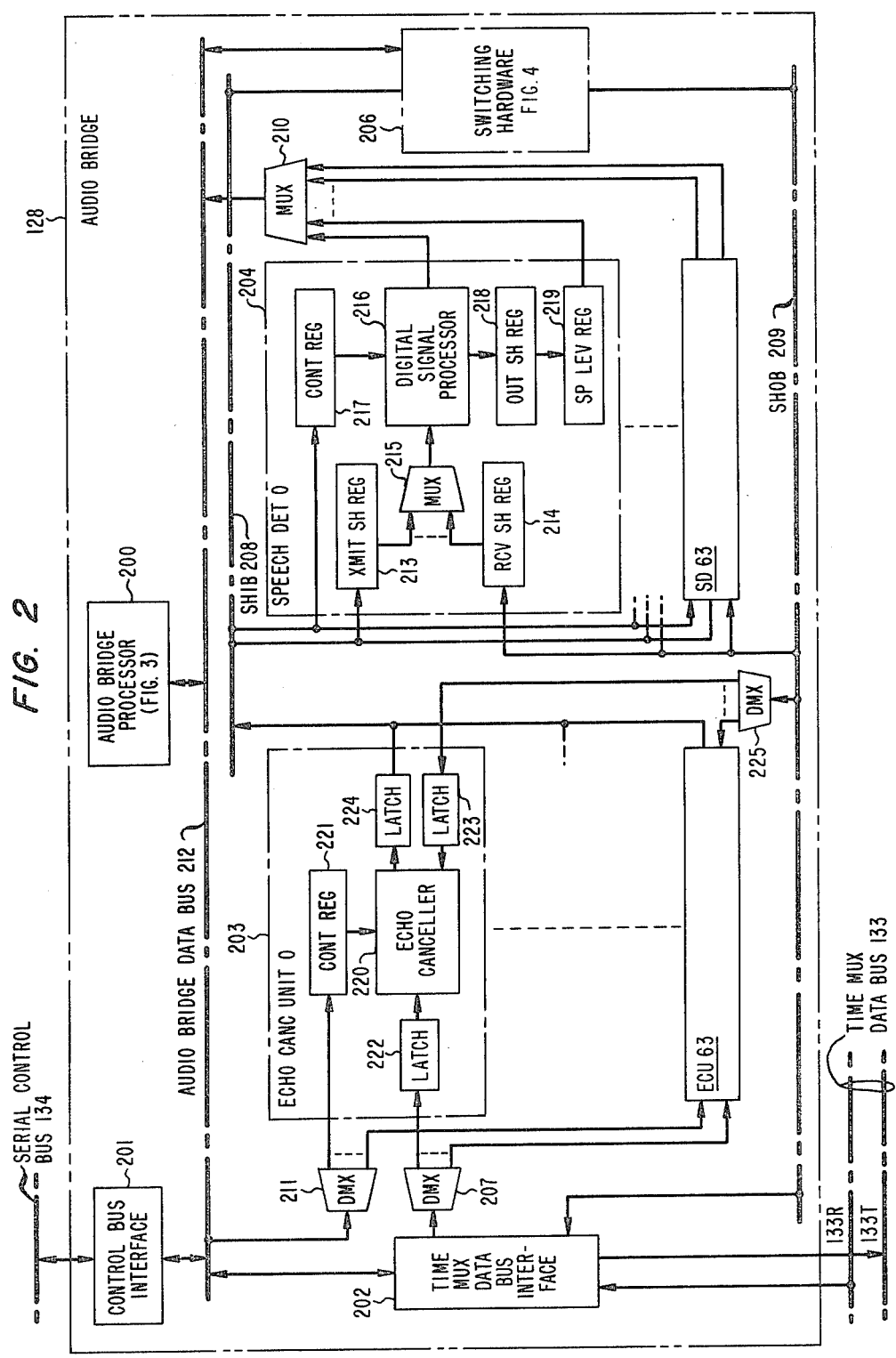
FIGS. 2-4 show a more detailed block diagram of the audio bridge portion of the network services complex with FIG. 3 showing the audio-bridge processor and FIG. 4 showing the audio bridge switching hardware.

The audio bridge conference system is a multiport digital conference arrangement and is illustrated in more detail in the block diagram of FIG. 2. The conference arrangement comprises an audio bridge processor 200, bus interfaces 201 and 202, a plurality of echo canceler units such as 203, a plurality of speech detectors such as 204, and switching hardware 206. A speech detector and an echo canceler are provided on a per-port basis to detect and measure the level of speech and to control the amount of echo, respectively. In this illustrative embodiment, 64 detectors and 64 echo cancelers have been provided to make up a 64 port (i.e., channel, time slot) audio bridge. Thus, the audio bridge can form conferences varying in size from one 64-port conference to twenty 3-port conferences. During each time frame, each port is monitored for information (speech) samples above a threshold level. Upon detecting a threshold level sample, the speech detector for that port generates two control signals. One is speech/no-speech indication which designates the port as having a threshold level sample and the other is a speech level estimate which is used for port selection and automatic level control. The audio bridge processor scans the speech detectors for these signals once each base cycle of operation to direct the switching hardware to include in the output sample only input samples from selected, designated ports. With one conferee speaking, only the input sample from the speaker is included in the output sample. With more than one conferee speaking simultaneously, the switching hardware sums the input sample from each speaker together to form the output sample.

Communication within the audio bridge between the audio bridge processor and other units is via audio bridge data bus 212. The audio bridge communicates with the rest of the network services complex, and therefore, the telephone network via serial control bus 134 and time multiplexed data bus 133. It is over serial control bus 134 that the audio bridge receives orders from and sends replies to NSC processor 101 for establishing and controlling conferences. Time-multiplexed data bus 133, on the other hand, comprises a transmit and a receive leg for handling the samples of speech to be summed and distributed for each conference.

Audio bridge processor 200 is a well-known 16 bit, bit-sliced microprogrammed controller that performs all common arithmetic, logic, and sequence control operations found in comparable 16 bit microcomputers. The audio bridge processor communicates with the NSC main processor via audio bridge data bus 212 and is programmed to scan the transmit and receiver buffers within serial control bus interface 201 for orders to control the conferences and to format replies to the NSC main processor.

The audio bridge processor also controls the status of the conference by writing control information into the switching hardware control memory. In addition, the processor also scans the speech detectors to obtain information about the speech level of every port of the conference, maps the speech level into control data, and then writes the control data into the switching hardware control memory for noise and automatic level control. Furthermore, processor 200 controls the operation of the echo canceler hardware by writing control data into the echo canceler control registers.

Figure 3:
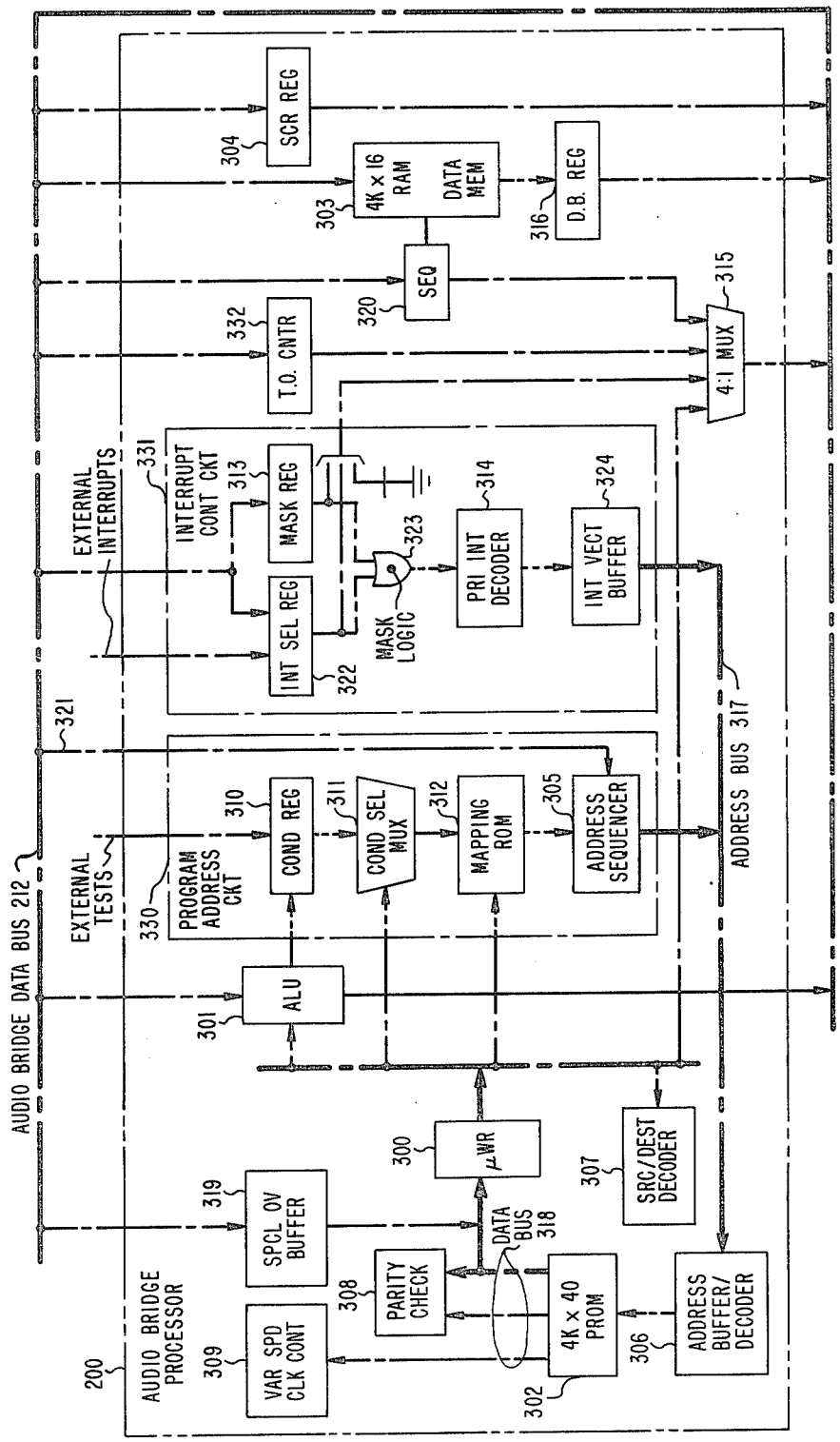

Audio bridge processor 200 is disclosed in more detail in FIG. 3 and comprises a number of well-known processor and memory units which are commercially available. The basic units include microword data register 300, arithmetic logic unit 301, a program memory such as PROM 302, program address circuit 330, interrupt control circuit 331, and a data memory such as RAM 303. The audio bridge processor contains two internal buses, namely, address bus 317 and data bus 318. Access to the other units of the audio bridge, such as echo cancelers, speech detectors and the switching hardware, is via audio bridge data bus 212 which can also be used to transfer data to and from registers internal to the audio bridge processor.

The audio bridge is arranged so that various units within the bridge can act as sources and destinations for data on audio bridge data bus 212. Accordingly, each instruction specifies the source and destination address for data to be moved on the audio bridge data bus. Each address for program memory 302 is generated by program address circuit 330 and transmitted over internal address bus 317 to program memory 302 via address buffer/decoder 306.

Program address circuit 330 includes condition register 310, condition select multiplexer 311, mapping ROM 312, and address sequencer 305. The output of address sequencer 305 provides the address for program memory 302. In addition, the sequencer is directly connected to data bus 212 via conductors 321 to obtain addresses from any of the audio bridge registers that are acting as sources on the bus. Condition register 310 and multiplexer 311 are used to make conditional jumps which may be based on addresses applied to mapping ROM 312 from microword register 300.

Portions of output of the program memory are then written into microword register 300, parity check circuit 308, and clock control circuit 309 via internal data bus 318. Microword data register 300 is a 32-bit latch that holds the instruction being executed. While the latched instruction is being executed, a new instruction is fetched, thus permitting a pipelined architecture. Clock control circuit 309 controls the number of clock cycles needed to execute the instruction by reading a field in the instruction. Parity of the instruction is calculated by parity check circuit 308. The instruction contained in microword data register 300 contains a source field, a destination field, and an overlay field. Interpretation of the overlay field depends on whether the instruction is for the arithmetic logic unit or the program address circuit. A special overlay buffer 319 is provided to allow words to be written into register 300 for diagnostic purposes.

The output of microword data register 300 is applied to arithmetic logic unit 301 and data bus source and destination decoder 307. Arithmetic logic unit 301 is a microprocessor capable of performing addition, subtraction, and other logical functions. Scratch-pad register 304 is also provided to conveniently move various types of data in arithmetic logic unit 301. Data bus source and destination decoder 307 decodes the source and destination address fields in the instruction to generate appropriate register input and output enable signals.

Data memory 303 in this embodiment is used as a temporary data store for the audio bridge processor and is controlled by sequencer 320 which permits the memory to act as both a data source and destination on data bus 212. When the memory is acting as a data source, the contents of buffer 316 are placed on bus 212. When the memory functions as a destination, address information from data bus 212 is loaded along with control information from data memory sequencer 320, and the sequencer can function in an autoincrement or a non-autoincrement mode depending on the control information.

Interrupt control circuit 331 is also provided in the audio bridge processor. The interrupt control circuit comprises select register 322, mask register 313, mask logic 323, priority interrupt decoder 314, and interrupt vector buffer 324. In this illustrative embodiment, up to seven levels of external user-devised interrupts and seven software interrupts have been provided. When the interrupt circuit acts as a destination on data bus 212, a portion of the data is written into select register 322 and the remaining portion is written into mask register 313. The software interrupt can then be executed by masking the output of the select register with the output of the mask register. The masked output is encoded by priority interrupt decoder 314 which drives select register 322, whose output accesses program memory 302.

Time-out counter 332 is provided to function as a sanity timer which generates interrupts on data bus 212 via data bus multiplexer 315. The multiplexer provides a one-out-of-four source selection to reduce loading on data bus 212 and allows the data memory sequencer, time-out counter, interrupt control circuit, and microword register direct access to the bus.

Returning to FIG. 2, it can be seen that the echo canceler units are provided on a per-port basis as mentioned above. Each unit comprises an echo canceler such as 220, a plurality of latches 222-224 for gating speech samples into and out of the echo canceler, and a control register 221 under the control of audio bridge processor 200.

During its assigned time slot, the echo canceler receives a near-end speech sample from time-multiplexed data bus interface 202 via demultiplexer 207 and latch 222 and a far-end speech sample from the switching hardware via demultiplexer 225 and latch 223 in $\mu 255$ companded format. Echo canceler 220 computes the estimated echo and subtracts this from the near-end speech sample. The resultant is transmitted via latch 224 to switching hardware input bus 208. The speech samples from the switching hardware are transmitted to the time slot interchange unit via time-multiplexed data bus 133 and interface 202.

The transmit and receive legs of the time multiplexed data bus 133 pass 256 time slots of PCM audio data to and from time slot interchange unit 124 of the network services complex. The audio bridge ports, however, need only 64 time slots. The interface 202, therefore, selects the 64 out of 256 time slots required for the audio bridge ports, formats the data, and generates clock signals for the echo cancelers, speech detectors, delay unit, and switching hardware to receive and transmit data.

Speech detector 204 shown in FIG. 2 comprises a digital signal processor 216, two input shift registers 213 and 214, an output shift register 218, and speech level register (latch) 219. The speech detector does not modify the flow of data from the echo cancelers to the switching hardware but merely monitors the data flow on both the input and output sides, i.e., buses 208 and 209, of switching hardware 206. This gives the audio bridge processor full control over the gain or loss modification of the audio data and also permits the bridge to operate with some or all of the speech detectors out of service.

The digital signal processor 216 receives a synchronization pulse in the time slot to which the speech detector is assigned, and upon receiving the pulse, the speech detector starts alternately reading data from the switching hardware input and output buses 208 and 209 via shift registers 213 and 214, respectively, and multiplexer 215. In executing its program, the digital signal processor transmits a speech level measurement to output shift register 218 and latch 219. Periodically, the audio bridge processor scans the digital signal processor for a speech indication and, if present, reads the speech level measurement from the latch. This data is then transmitted over data bus 212 via multiplexer 210 which buffers data from all the speech detectors.

The audio bridge processor controls the digital signal processor 216 within the speech detector via control register 217. By setting register 217, the digital signal processor can be put in any one of a number of operational or maintenance modes.

An example of a digital signal processor suitable for use in the present invention is disclosed in the *Bell Sys-* tem *Technical Journal,* Vol. 60, No. 7, Part 2, (September, 1981).

Switching hardware 206 performs three major functions in the conference arrangement, namely, it sums the speech samples from the time slots (ports, channels) into their respective conferences to form an output sample for each conferee, implements noise and automatic level control on incoming speech samples, and implements echo control by switching loss into the speakers receive path when echo cancelers are not effective. The audio bridge processor 200 controls these functions by writing the coefficient memory of the switching hardware with appropriate coefficients.

Conference summation is a two-step process which occurs over two time frames, where a frame comprises a maximum of 64 audio bridge time slots. The mouth samples for a given time frame are first combined to form a sum for each conference. Then, in the following time frame, an ear sample is produced for each conferee by subtracting the conferees mouth sample from the conference sum. This process allows for a pipelined architecture where the two operations occur concurrently but on two different time frames of data.

Figure 4:
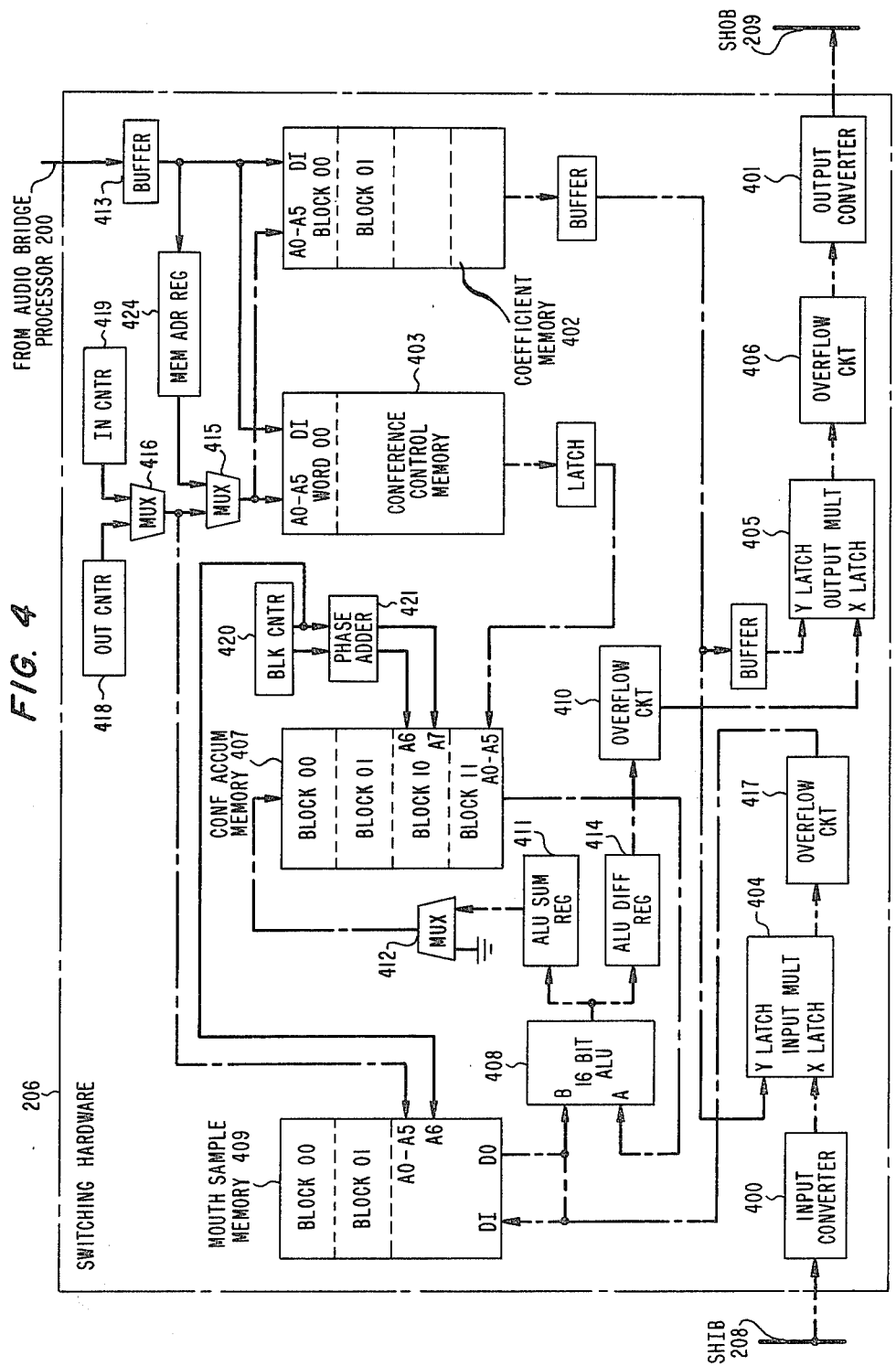

The switching hardware used in this embodiment of the invention is shown in more detail in FIG. 4. The switching hardware receives the output of the echo cancelers over switching hardware switching hardware input bus 208. Data is in the well-known $\mu$255, eight-bit parallel format. This data is first converted to a 13-bit linear form by converter 400 using a table lookup operation, and the linear data is forwarded to input multiplier 404.

Input multiplier 404 implements the noise and automatic level control in the audio bridge. The two inputs to the multiplier are the linear mouth sample from converter 400 and a coefficient from coefficient memory 402 as determined by audio bridge processor 200. The coefficient can yield a gain or loss. When the coefficient is equal to zero because there is no talking on a conferee port, the background noise related to that time slot is eliminated.

To insure that both the multiplier and, indirectly, the coefficient are valid, overflow circuit 417 checks for products larger than can be allowed in the bridge. If an overflow condition is detected, the output is forced to a maximum level corresponding to the sign-bit of the output.

The output of the overflow circuit 417 is then applied to addition and subtraction hardware to produce the conference sums for each frame and the individual ear samples. The addition and subtraction is performed by arithmetic logic unit 408 in cooperation with memories 403, 407, and 409. When producing the total conference sum, arithmetic logic unit 408 adds an adjusted mouth sample from input multiplier 404 to the partial sum of the conference which is an accumulation of mouth samples from all time slots in the same time frame for the particular conference. The partial sum has been stored in accumulator memory 407 via sum register 411 and multiplexer 412.

To produce an ear sample for each conferee, the conferee's mouth sample from the previous frame is taken from memory 409 and subtracted from the total sum of all mouth samples from the same frame of the conference.

The conference accumulator from an operational point of view, contains two blocks of stored data, namely, the partial sum of mouth samples of the current frame and the total sum of all mouth samples received during the previous frame.

The addressing of coefficient memory 402, control memory 403, accumulator memory 407, and mouth sample memory 409 is controlled by time slot and frame counter circuits. The blocks of data associated with each time slot in the memories are addressed by input and output time slot counters 418 and 419 via multiplexer 416. Since mouth sample memory contains two data blocks for each time slot, frame counter 420 is used to address the desired block of data. With accumulator memory 407, phase adder 421 in response to the frame counter addresses one of four data blocks associated with each time slot.

As noted above, the audio bridge processor controls each conference as to its membership based on orders received from NSC processor 101 audio bridge processor 200 also controls the number and level of simultaneous speakers. The audio bridge processor exercises this control through the use of control memory 403 and coefficient memory 402.

Control memory 403 consists of 64 words, each of which is associated with a conference port, i.e., a time slot. The control memory is written by audio bridge processor 200, via buffer 413, program address register 424, and multiplexer 415, and the word for each time slot contains the address of the conference accumulator to which a time slot is associated. Thus, whenever a time slot sample is added to a partial sum or subtracted from a total sum, the sample in accumulator memory 407 is pointed to by control memory 403.

Coefficient memory 402 contain two words per time slot. One word corresponds to the input coefficient for adjusting the speaker's sample, and the other is for adjusting the listener's sample that is transmitted to a conferee.

The output of arithmetic logic unit 308 that is to be transmitted to a conferee is transmitted via difference register 414 and overflow circuit 410 to output multiplier 405. Multiplier 405 adjusts the ear sample by the coefficient factor received from memory 402 to provide additional echo control. Similar to the input operation, overflow circuit 406 makes sure that the level of the ear sample does not exceed a certain amount, and the resultant is converted back to $\mu$255 format by output circuit 401. The companded signal is transmitted over switching hardware output bus 209 via time-multiplexed data bus interface 202 in FIG. 2 to time-multiplexed data bus 133. It is via this data bus and the NSC time slot interchange unit that the summed speech samples are distributed over the communication network to the conferees. Having described the bridge hardware, a brief description of the data flow through the bridge is in order. During each time frame, 64 time slots of PCM data enter the audio bridge via time-multiplexed data bus 133. Each time slot of data is first sent to an echo canceler such as 203 where various degrees of echo suppression may be performed. The data leaves the echo canceler unit and is sent to the switching hardware which sums the incoming data and distributes the resulting combination to each port in a conference.

A speech detector for each of the 64 ports (i.e., time slots, channels) monitors the data going into the switching hardware and generates a speech/no-speech (busy/idle) indication and a speech level estimate. An eight-bit number in a speech level register such as latch 219 represents the speech level estimate or more particularly, the energy level on the port, whereas, the digital signal processor generates the speech/no-speech indication. The audio bridge processor scans each speech detector every base cycle to obtain the speech/no-speech indication and the speech level estimate. These are then used by a conference processing program to select which ports of a conference are enabled on the bridge. Samples from an enabled port are included in the resulting output sample distributed to each port of the conference.

4. Data Bridge System

Figure 6:
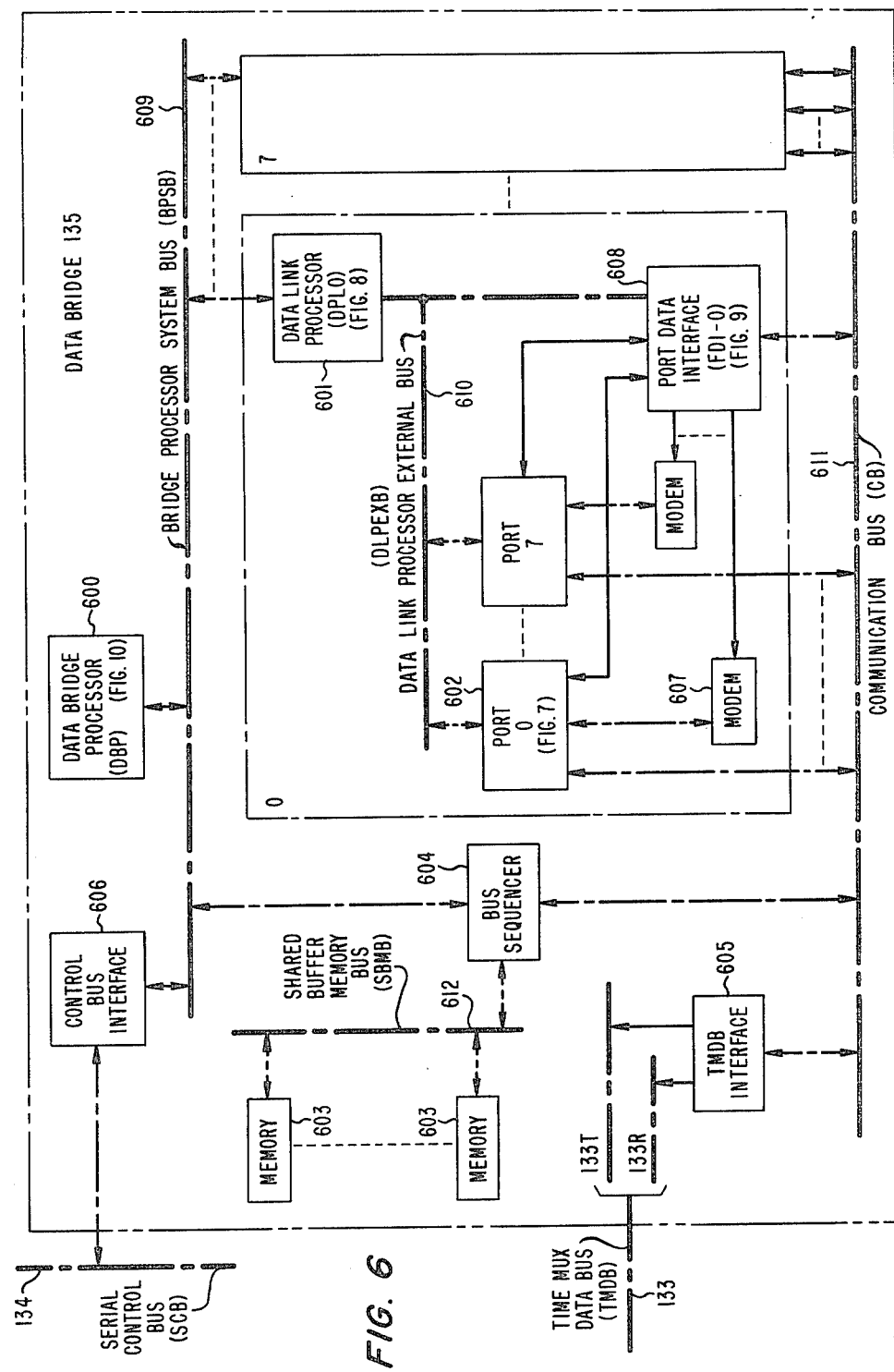
FIGS. 6-10 show the data bridge system of the network services complex with FIG. 7 showing a typical data port, FIG. 8 showing a typical data link processor, FIG. 9 showing the port data interface and FIG. 10 showing the data bridge processor.

The apparatus of the data bridge is more fully disclosed in FIG. 6. As shown in FIG. 6, data bridge 135 comprises data bridge processor 600, a plurality of data link processors, such as 601, a shared buffer memory 603 and a bus sequencer 604. Associated with each data link processor is a port data interface, such as 608 and a plurality of ports, such as 602. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 134 which handles the control functions and the time multiplex data bus 133 which handles the data functions.

Access to the control bus 134 is determined by NSC processor 101 acting as a master unit with units such as data bridge 135 acting as a slave. Each slave has a designated interrupt lead to signal the master when the slave wants to use the bus and the master has a cutoff lead associated with each slave to halt the slaves operation on the bus.

The time multiplex data bus 133 is a bit parallel, word sequential, bi-directional data bus providing 256 channels at a 64Kb/sec bit rate. Sixty-four of the channels (i.e., one per data bridge port) are dedicated to the data bridge in this embodiment, and the other channels are used for other slave units such as audio bridge conference system, data store, etc.

For illustrative purposes, it has been assumed that customers using the data bridge will communicate over the network trunks using at least two different modes of communication. Thus, some customers will use trunks that provide a 4.8Kb/sec half-duplex connection while other customers will use trunks that provide a full-duplex connection at a 56Kb/sec data rate.

Each of these modes of data communication will also require different sequences of signals between the customer's data terminals and the data bridge. However, the bridge will appear transparent to the different terminals by virtue of its ability to configure itself to the data speed and signaling of any trunk.

It has also been assumed for purposes of illustration that the data terminals communicate over the network to the data bridge using the Group IV facsimile protocol recommended by the CCITT but not yet standardized. Of course, it will be obvious to those skilled in the art that there are other data speeds and protocols that can be used within the spirit and scope of the invention.

The proposed Group IV protocol is a 7-layer protocol but not all levels may be utilized by the data bridge. Level 1 provides the mechanical, electrical, functional, and procedural characteristics to establish, maintain and disconnect circuits between data terminals and switching equipment. This level may indicate full-duplex or half-duplex operation, synchronous or asynchronous operation, etc. Level 2 is referred to as the "link layer" and deals with initiation, error control, and flow control, while level 3 will not but could be implemented in this embodiment of the data bridge.

Level 4 called the "transport layer" optimizes the use of available communication facilities which may be accessible from a single interface. This would include routing instructions and the like. Level 5 on the other hand is the "session layer" which establishes, administers, and transmits communication between two end point facilities. In other words, the two end point facilities must exchange information as to their capabilities with respect to device types and terminal features. For the purpose of simplifying this disclosure, it has been assumed that only facsimile devices are to be conferenced by the data bridge.

Level 6 of the protocol is referred to as the "document layer" and defines the data types, and document composition, while the level 7 protocol may be defined by the user and will not be discussed herein.

Returning now to FIG. 6 and a description of the apparatus, data bridge processor 600 is the main control processor. It interfaces with NSC processor 101 via serial control bus 134 from which it receives conference configuration information and to which it reports conference status. Data processor 600 is connected to the shared buffer memory 603 via the bridge processor system bus 609 and bus sequencer 604. It is from the shared buffer memory 603 that the data bridge processor 600 obtains session and document protocol data. Data bridge processor 600 can also access the various data link processors via bus 609 to control port configuration and monitor the port status. Furthermore, the overall maintenance functions of the data bridge are performed under the control of the data bridge processor.

Each data link processor interfaces with eight high-level data link control ports, such as port 602, to control the port configuration as commanded by data bridge processor 600. The data link processors also handle all link-level protocol procedures except synchronization, cyclic redundancy checking and bit insertion.

The ports, such as port 602, handle actual frame transmission and reception of the level 2 protocol. The ports interface with a port data interface such as 608 from which they receive 56Kb/sec serial data and they interface with a modem such as modem 607 from which they receive 4.8Kb/sec serial data. The ports can also interface directly with the shared buffer memory on a time-shared basis via communication bus 611 to read out of the memory information to be transmitted over the network to a conferee or write into the memory data received from a conferee as directed by the associated data link processor.

The major modules of the data bridge shown in FIG. 6 have also been shown in more detail in other figures of the drawing. A description of these modules will now be given beginning with a description of port 602 as shown in FIG. 7.

Port 602 receives and transmits high-level data link control frames in serial format at data rates determined by external clocks. In this illustrative embodiment, only two data rates are being considered, namely, 4.8Kb/sec and 56Kb/sec. The port also performs all of the data transfer to and from the shared buffer memory 603 for the information portion of the frames, and the port determines when and where to receive and transmit frame by commands over bus 610 received from its associated data link processor. After a command is executed by a port, the port responds to the data link processor to indicate the command has been executed. Communication between the port and its data link processor is via a shared memory.

Figure 7:
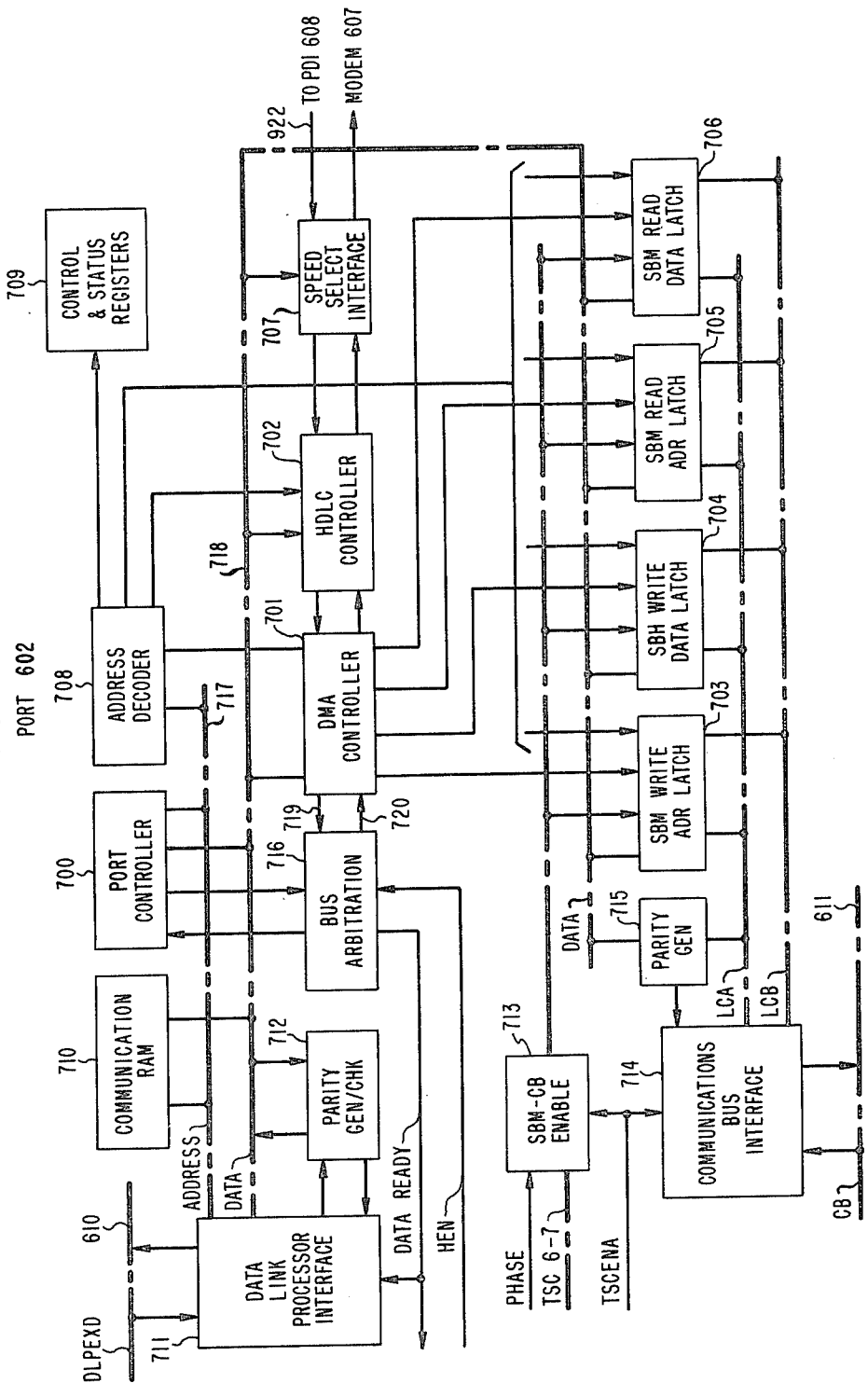

As shown in FIG. 7, the port consists of a port controller 700, direct memory access (DMA) controller 701, high-level data link (HDLC) controller 702, communications RAM 710 and other units for interfacing with the various bus systems.

The port controller 700 includes a microprocessor having an EPROM for program storage and provides control of the port by executing commands received over bus 610 from the data link processor. A port can function to transmit a frame and receive a frame of data at the same time. The port has an internal address bus and a data bus 717 and 718, respectively, and these buses are coupled to the data link processor external bus 610 via interface 711. Within the port itself, buses 717 and 718 are directly coupled to RAM 710 and port controller 700 and are coupled via address decoder 708 to the DMA controller 701, HDLC controller 702, and the shared buffer memory address latches and data latches 703-706. The port controller 700 controls the operation of the other above-mentioned devices over buses 717 and 718.

Since the data link processor can read and write all of the same external addresses that port controller 700 within the port can, and the DMA controller 701 can access the shared buffer memory address latches and data latches 703-706 via buses 717 and 718, a bus arbitration unit 716 is provided. This allows data link processor 601 (FIGS. 6 and 8), DMA controller 701, and port controller 700 to share access to the port address bus 717 and port data bus 718 as required.

When DMA controller 701 needs access, it asserts a hold request signal over conductor 719 which causes port controller 700 to stop execution at the beginning of its next cycle. An acknowledge signal is returned over conductor 720 and DMA controller 701 has access to the bus until it removes its request. When data link processor 601 needs access to the bus, it simply addresses the port and port controller 700 stops at the beginning of the next instruction. If both DMA controller 701 and data link processor 601 request access to the port bus, the device which first requested is given access and the DMA controller 701 is given preferred access when simultaneous requests are received at the port.

The data link processor 601 sends orders to the port controller via the shared communications RAM 710.

Data from a conferee is received by the port from the port data interface or from a modem, and the port is directed to function at a particular data rate by a signal from the port data interface. If the port is to receive data from a conferee who is transmitting at the 4.8Kb/sec data rate, the information is sent via a modem (such as modem 607 in FIG. 6) to speed select interface 707. Interface 707 provides the 4.8Kb/sec data and control information to be used by HDLC controller 702 and port controller 700 firmware. Interface 707 also provides several control signals to the modem.

The HDLC controller 702 provides framing, bit stuffing, cyclic redundancy generating and checking functions, and serial-to-parallel data conversion between the port 8-bit parallel data bus and the port data interface 608 or modem 607.

The HDLC controller 702 is under control of port controller 700. For example, port controller 700 could write a "receive" command coupled with a "maximum buffer length" into the HDLC controller 702. The HDLC controller would then receive bytes of data and put them in the shared buffer memory via DMA controller 701 and the write latches 703 and 704. Upon completion of the frame, the HDLC controller 702 would notify port controller 700 and controller 700 could read the results.

As mentioned above, the port controls the read/write functions of all conferee data out of and into the shared buffer memory. Access to the shared-buffer memory is on a fixed time-slot basis over communication bus 611 via interface 714 and enable circuit 713. Each port is assigned one read and one write cycle every 125 $\mu$sec which provides an effective data rate of 64Kb/sec that exceeds either of the two different modes of customer communication described above.

The read and write portions of DMA controller 701 handle read and write requests from HDLC controller 702. DMA controller 701 also manages the data and address latches 703-706 and determines when read and write functions are to be done.

The initial address of a frame consists of 24 bits making 16 megabytes of a shared buffer memory accessible to a port. The memory is divided into 1 Kbyte blocks and a new address is written for each frame.

To receive a frame, the port controller simply loads the DMA controller 701 with the lower 16 bits of the frame address while the upper 8 bits are loaded into the write address latch 703. The maximum byte length of a frame is loaded into the terminal count of the write portion of DMA controller 701. When a byte becomes available from HDLC controller 702, DMA controller 701 gains access to the port buses and loads the low-order 16 bits into the write address latches. The DMA controller then enables data to come from the HDLC controller to the write data latches 704.

Each port is guaranteed one shared buffer memory read and one write every 125 $\mu$sec and when the appropriate time-slot count is decoded, the read or write is done based on the latched read or latched write signal. When the latched write signal has been set, the next time a write time slot for the shared buffer memory occurs, the upper 16 bits of the address are strobed onto communication bus 611 followed by the lower 8 bits of the address and the received data byte. The latched write signal is then cleared automatically. Similar action takes place for reading the shared buffer memory.

The port 602 shown in FIG. 7 also contains control and status registers 709. The control register can be set by the local port controller 700 or by the data link processor 601 and the register is selectively set to cause certain events to occur. For example, a "cut-off" bit can be set in the register by the data link processor to cause the port controller to be removed from service. Also, the port controller can set a "service" bit when it requests action by the data link processor. Setting the service bit causes an interrupt to the data link processor.

The status register contains several bits which can be set by various units in the port to report their status. A bit designated "digital" is set by the port data interface to indicate the data speed that the port is to receive, and the status register contains other status bits to indicate when a write or read to the shared buffer meemory is to occur.

The port data interface 608 is shown in more detail in FIG. 9 and now will be described. In this illustrative embodiment, the port data interface functions with eight port units, such as port 602, which is shown in FIG. 7. The port data interface performs the function of interfacing the ports and the time multiplex data bus for the different modes of transmission utilized by conferees. As mentioned above, for purposes of illustration, the conferees can communicate over the network channels using 4.8 or 56Kb/sec data rates. Port data interface 608 receives data from and transmits data to the network services complex time-slot interchange frame 124 (FIG. 1) via the time multiplex data bus 133 and communication bus 611 at a 64Kb/sec rate compatible with the standard T1 trunks at the toll switching center 102. Thus, each 8-bit byte of data at the T1 data rate on communication bus 611 may represent either a 4.8Kb/sec conferee channel or a 56Kb/sec conferee channel.

For the 56Kb/sec conferee, the port data interface strips off the signaling bit and converts the 8-bit byte of data from its parallel format on communication bus 611 into a serial format which it transmits directly over conductor 922 to the speed select interface unit in port 602. For a conferee transmitting at a 4.8Kb/sec rate over the network, the 8-bit data byte is converted to serial and transmitted to CODEC 920. CODEC 920 converts the serial PCM information to analog and transmits the analog signal to modem 607 (shown in FIG. 6). Modem 607 converts the analog signal back into a digital format, and this data stream is transmitted to the speed select interface in port 602. Then, as mentioned above, the port can store the data in the shared buffer memory using the communication bus 611 and the time multiplex data bus 133.

Thus, the data stored in the shared buffer memory after being processed by the port data interface and the port is in the same format for all conferees regardless of the data rate that the conferee terminals were using. This data can then be extracted from the shared buffer memory by any port for transmittal to any conferee at the data rate compatible with that conferee.

Figure 9:
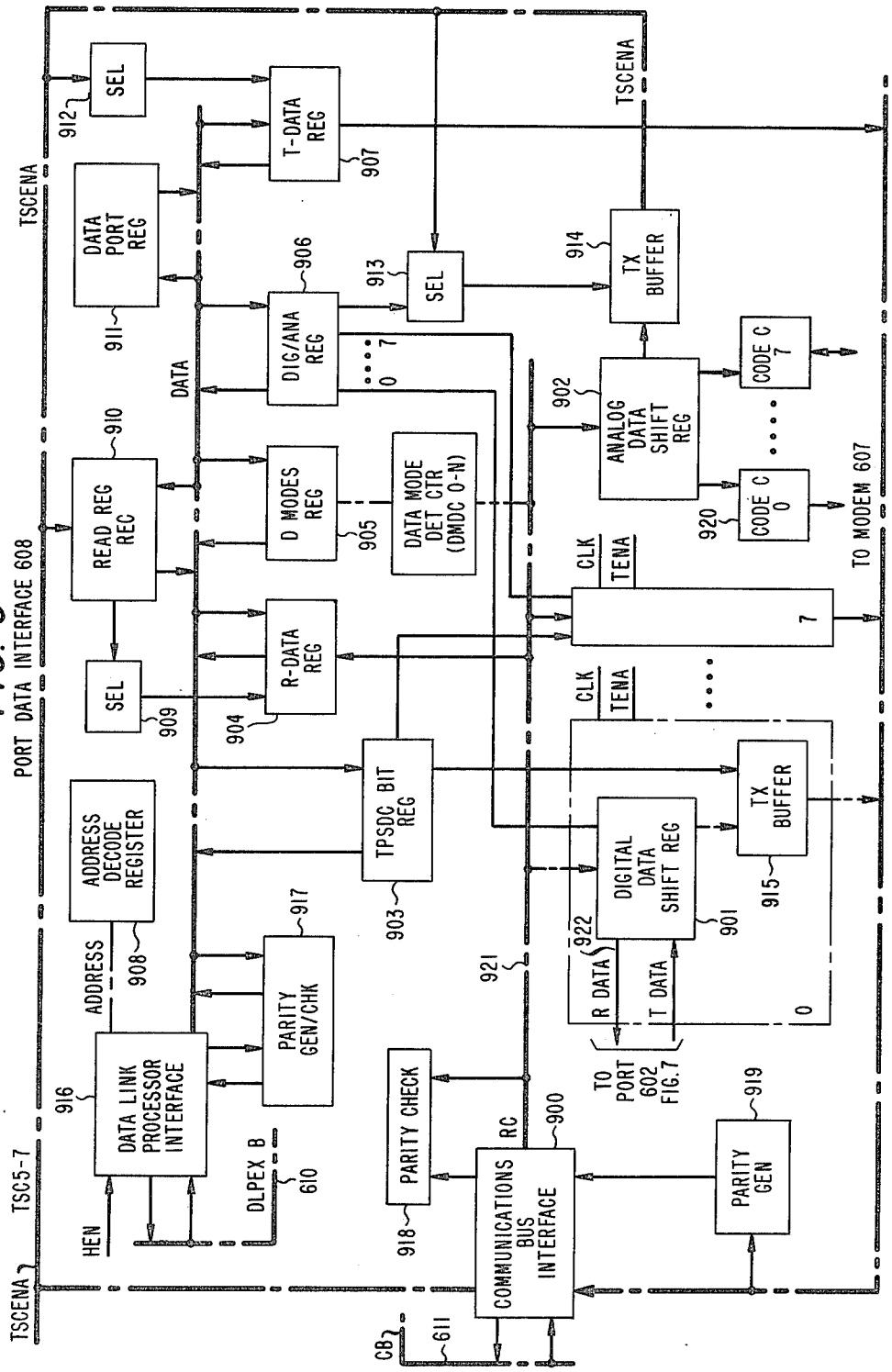

The port data interface 608 as shown in FIG. 9 has several control registers which can be accessed directly by the data link processor over bus 610, and these registers control the selection of data speed conversion and the transmission of an idle code on an idle channel as dictated by the data link processor 601.

Receive data register 904 and transmit data register 907 are 8-bit registers that are used for writing and reading, respectively, data to and from communication bus 611.

The other registers are formatted so that each register contains a bit for each port and each register corresponds to a function for the ports as follows: register DIG/ANA 906 contains a bit per port which determines the bit rate to be transmitted and received by the port, register DATAPORT 911 contains a bit per port which enables or disables the serial data to be sent or received to or from a port, register DMODES 905 is a read-only register which contains a bit per port that indicates whether or not the data being received is at the 56Kb/sec, the register TPSDC BIT 903 also contains one bit for each port and specifies that the eighth bit of each byte of the 56Kb/sec data stream should be transmitted over the time multiplex data bus, and register READREG 910 contains one bit per port and when the bit is set, the contents of the time multiplex data bus for that port is read into receive data register 904.

The operation of the port data interface can best be understood by describing how the port data interface handles data when the conferee is utilizing 56Kb/sec data terminal, and the data must be transmitted between a port and the time multiplex data bus which handles data at 64Kb/sec.

Let it be assumed that the data link processor has transmitted an order to the data port interface to set the DIG/ANA register 906 to indicate that port 602 should be in the 56Kb/sec data speed mode. Eight-bit parallel data received from the time multiplex data bus via communication bus 611 is checked for parity by parity check circuit 918 and shifted into a digital data shift register such as 901 which corresponds to port 602. The signaling bit which indicates whether the far-end terminal is in the control or data mode is stripped off the incoming signal and the remaining seven bits are shifted out serially via conductor 922 to the port. At the same time, serial data from the port is shifted into register 901, and after seven bits have been collected, a signaling bit is appended thereto and eight bits are loaded into transmission buffer 915. At the proper time-slot count, buffer 915 is unloaded to transmit the data over communications bus 611 and the time multiplex data bus and via the time-slot interchange 124 to the far-end terminal.

The signaling bit indicates the mode of the channel. More specifically, in the voice mode the bit will change from 0 to 1 and vice versa, while in the digital data mode, the bit is a contiguous stream of ones and a contiguous stream of zeros are sent out to indicate the digital control mode.

The received signaling bits are counted to determine whether the channel is in the data or control mode and any change in the mode causes an interrupt signal to be sent to the data link processor.

The bits in each of the registers 906 and 911 when taken together, specify the state of each port. Thus, a 0 to 1 in the DIG/ANA register 906 indicates the channel is in the 56Kb/sec or 4.8Kb/sec mode, respectively. Furthermore, if the port is in the 56Kb/sec mode, then the 0 or 1 in the DATAPORT register 911 indicates the control of data mode of the channel, respectively. In the control mode, whatever has been loaded in the transmit data register 907 is sent over the time multiplex data bus, while in the data mode, serial data from the port is sent out.

The port data interface under control of the data link processor will go through three general sequences for setting up and taking down a leg to a data conferee. A monitor sequence is executed to determine whether the far-end (i.e. conferee) terminal is in the control mode or not. In this sequence, the conference originator's voice path is connected to both the transmitting and receiving paths of the far-end terminal via the time-slot interchange unit of the network services complex. The port data interface is connected only to the receiving path from the terminal through the same time-slot interchange unit, and since the far-end terminal is in the voice receiving mode, it will either be in the control or voice mode but not the data mode.

The monitor sequence is initiated when the data link processor sets up the port data interface to read data from the time multiplex data bus. This is accomplished by setting the bit for port 602 in register 906, conditioning the port data interface to receive data at the 56Kb/sec data rate. The data port (DATAPORT) register 911 is also set for this port to disable serial data from the port and to cause the output of transmit data register 907 to be transmitted over the time multiplex data bus.

The contents of the receive portion of the time multiplex data bus are then read into receive data register 904, and a software counter is set up to count the number of time slots that the "control mode idle" code is received. Every 125 ms, a new byte, is available in register 904. If the control mode idle character is not found, it means that the far-end terminal is not in the digital control mode.

Each time a control mode idle character is detected, the counter is incremented and eight consecutive bytes must be received before the data bridge determines that the far-end terminal is in the control mode. Upon detecting that the port is in the control mode, a "monitor success" response is reported by the data link processor to the data bridge processor.

The connect sequence of events describes the data link processor and port data interface operation in setting up a port so that it can be added to a conference. This sequence begins by executing the monitor sequence described above. The data link processor also sets the transmit data register 907 to the control mode idle byte, and the control mode idle character is transmitted to the far-end terminal eight times.

The data link processor then sets the bit in register 903 associated with port 602 causing the digital data mode character to be transmitted. Also, the bit in DATAPORT register 911 is set to enable the port to transmit and receive serial data.

A software counter is then set-up to time the interval it takes for the far-end terminal to switch to the data mode, since after the bit in register 911 is set, the incoming signaling bit should eventually change to a series of ones indicating that the far-end terminal has switched to the data mode.

If a time-out occurs before the far-end terminal changes mode, a link failure message is sent by the data link processor to the data bridge processor, and the connect attempt is aborted.

If a change of mode is detected, the counter is incremented and a counter of 48 consecutive ones of the signaling bits must be detected to signify a change to the data mode. When a change to the data mode is detected, a link success message is sent by the data link processor to the data bridge processor.

A disconnect sequence is entered into by the data link procesor to terminate transmission on the channel. The sequence is initiated by an order from the data bridge processor to the data link processor, while the channel is being monitored for the control mode or while the channel is being set-up or is operational on a data conference call.

When the data link processor receives the command, it resets the READREG register 910, DATAPORT register 911, and the DIG/ANA register 906 and upon completion, notifies the data bridge processor that the link has been successfully disconnected.

As mentioned above, eight data link processors are provided in this embodiment of the invention to interface the ports with the data bridge processor. The basic function of the data link processor is to control the configuration of its eight ports as directed by commands for the data bridge processor and also to handle all link level protocol procedures except synchronization, cyclic redundancy checking and bit insertion. Furthermore, the data link processor reports back to the data bridge processor when specific tasks have been executed.

Figure 8:
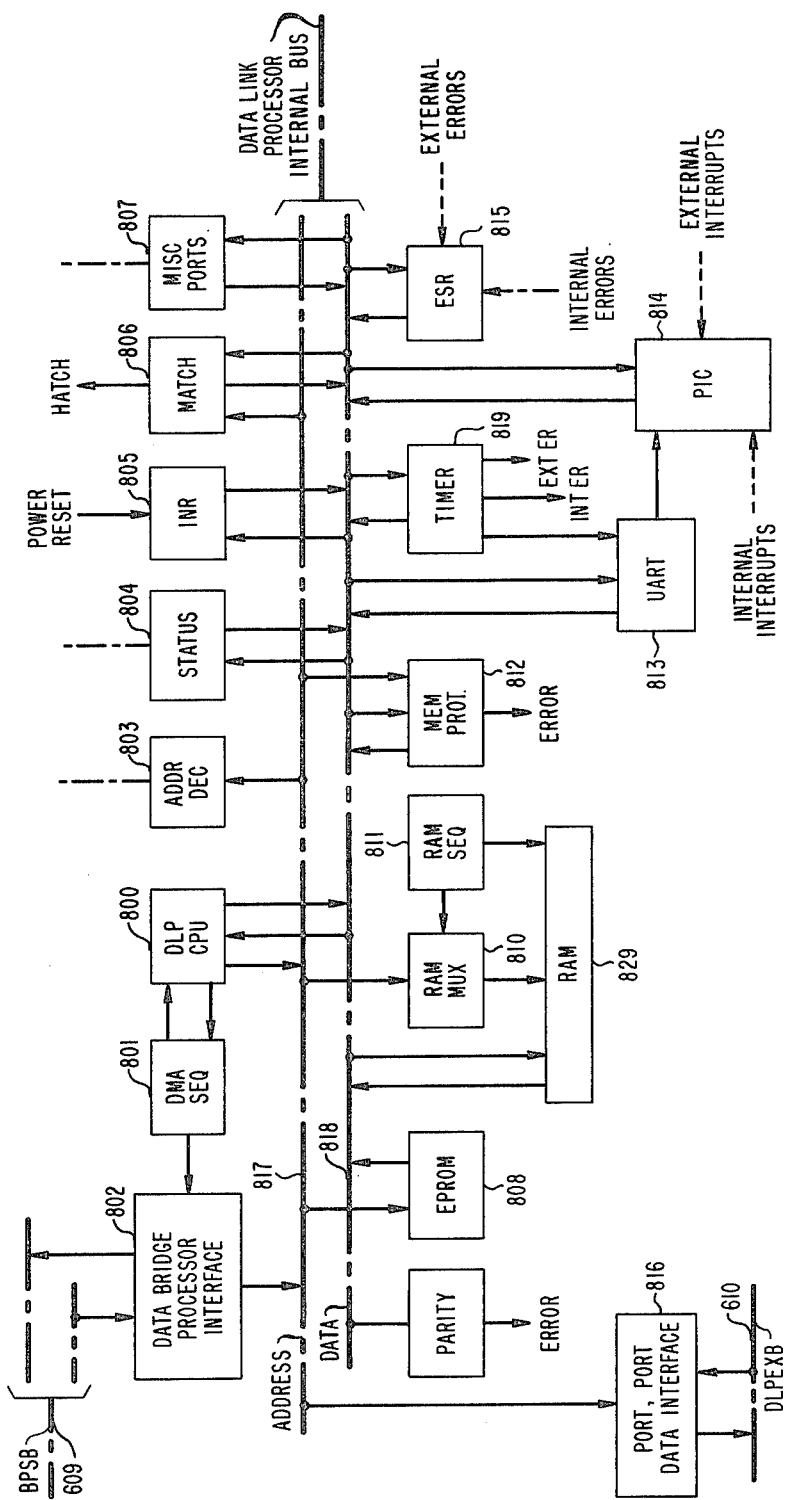

The data link processor is an 8-bit microprocessor based system and as shown in FIG. 8 comprises a read-only memory 808, a RAM 829, a programmable interrupt controller 814, a programmable timer 819, and various other units. The data link processor interfaces with the data bridge processor via the bridge processor system bus 609 and interface 802. Likewise, access to the port data interface and the ports is via the data link processor external bus 610.

The central processing unit 800 is an 8-bit central processing unit which is interconnected with the other units of the data link processor via an 8-bit data bus 818 and a 16-bit address bus 817.

The data bridge processor (FIGS. 2 and 10) addresses one of the data link processors over the bus 609 and interface 802. Once data link processor 601 is selected, the central processor 800 relinquishes control of address bus 817 to permit the data bridge processor to select data within the data link processor.

Priority interrupted controller 814 allows for priority interrupt of several levels for interrupts caused by units within the data link processor and for external units in its corresponding port data interface and the eight ports associated therewith.

When an interrupt is received by controller 814, it transmits an interrupt request to processor 800. Processor 800 ascertains the nature of the interrupt and reads from its memory the first instruction of the interrupt service routine to be performed.

Error source register 815 provides the means for processor 800 to recognize errors occurring within the data link processor or externally. Internal errors can occur as a result of a parity failure detection on one of the buses, time-outs, RAM failure, etc. Hardware failure in the port data link or ports are considered external error failures insofar as the data processor is concerned, and these are detected by register 815.

The status register 804 is provided to indicate the status of several hardware units within the data link processor or under its control. Also, certain bits in the status register can be set by the data bridge processor to cause the data link to interrupt or to be reset.

The data link processor shown in FIG. 8 also includes an interface 816 which permits the data link processor to interface with the ports and the port data interface. Certain of the leads of address bus 817 are extended via the interface to the ports and to the port data interface along with the data bus 818. The output of address decoder 803 selects the port data interface or one of the ports. When a port is selected, the data link processor must wait for the port to complete its current memory cycle before the data link processor can use the port bus. The port controller then relinquishes the bus to the data link processor allowing the data link processor to complete its operation within a fixed time interval.

Figure 10:
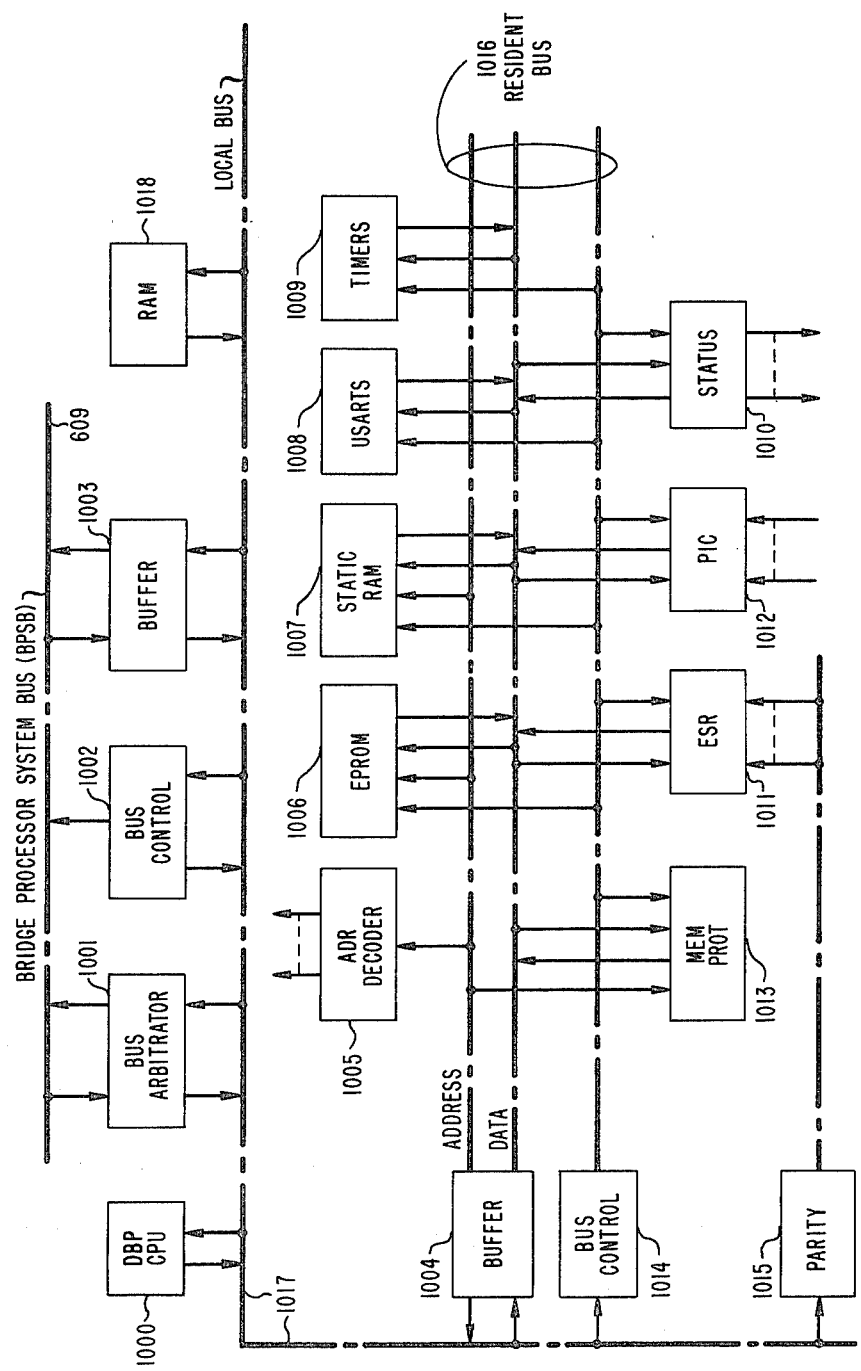

The data bridge processor 600 is the main control processor of the data bridge system and is shown in FIG. 10. In this embodiment, the data bridge processor comprises a 16-bit central processing unit 1000 memories 1006, 1007 and 1018, priority interrupt controller 1012 and other miscellaneous circuits.

Central processing unit 1000 utilizes two resident memories, namely, RAM 1007 and EPROM 1006 and accesses these memories via a resident bus 1016. For program storage and for scratch pad memories, the data bridge central processing unit 1000 utilizes dynamic RAM 1018 which is accessible over local bus 1017.

The data bridge processor has access to the bridge processor system bus 609 via bus arbitrator 1001, bus control 1002, and buffer 1003, and its over this bus that the data bridge processor can access the shared buffer memory 603 and any of the eight data link processor memories previously described. Furthermore, it is over bus 609 that the data bridge processor can communicate with the network services complex processor 101.

Priority interrupt controller 1012 provides prioritized interrupts from the units within the data processor and also from external units such as the eight data link processors. The controller 1012 automatically resolves the priority among the simultaneous interrupts according to a preassigned schedule.

The shared buffer memory 603 as shown in FIG. 6 is used to temporarily store the data that is passed among the ports and the data bridge processor during a conference. In this embodiment of the invention, the memory is made-up of six modules of dynamic RAM wherein each module contains up to 512 kilobytes of memory.

The memory is accessible via communication bus 611 for the ports and the port data interfaces and via the bridge processor system bus 609 for the data bridge processor and the eight data link processors. But sequencer 604 provides the timing, memory refresh and access allocation for these buses.

The 125 ms frame interval is divided into 64 sub-frames, each corresponding to a port of the data bridge. Every sub-frame is further divided into two port access cycles and one data bridge processor access cycle. During a port access cycle, the shared buffer memory bus 612 is connected to communication bus 611, and the port that has been selected by the time-slot count can drive these buses to read from or write data into the shared buffer memory. The data bridge processor accesses the shared buffer memory during its portion of the sub-frame cycle with the exception of one cycle out of eight which is used for refreshing the memory.

5. Sequence of Operations—Audio/Data Conference

The overall operation of the conference arrangement can best be illustrated by describing, with respect to the flow diagram of FIGS. 12-20, the sequence of events that take place when a customer originates an audio/data conference call.

Figure 15:
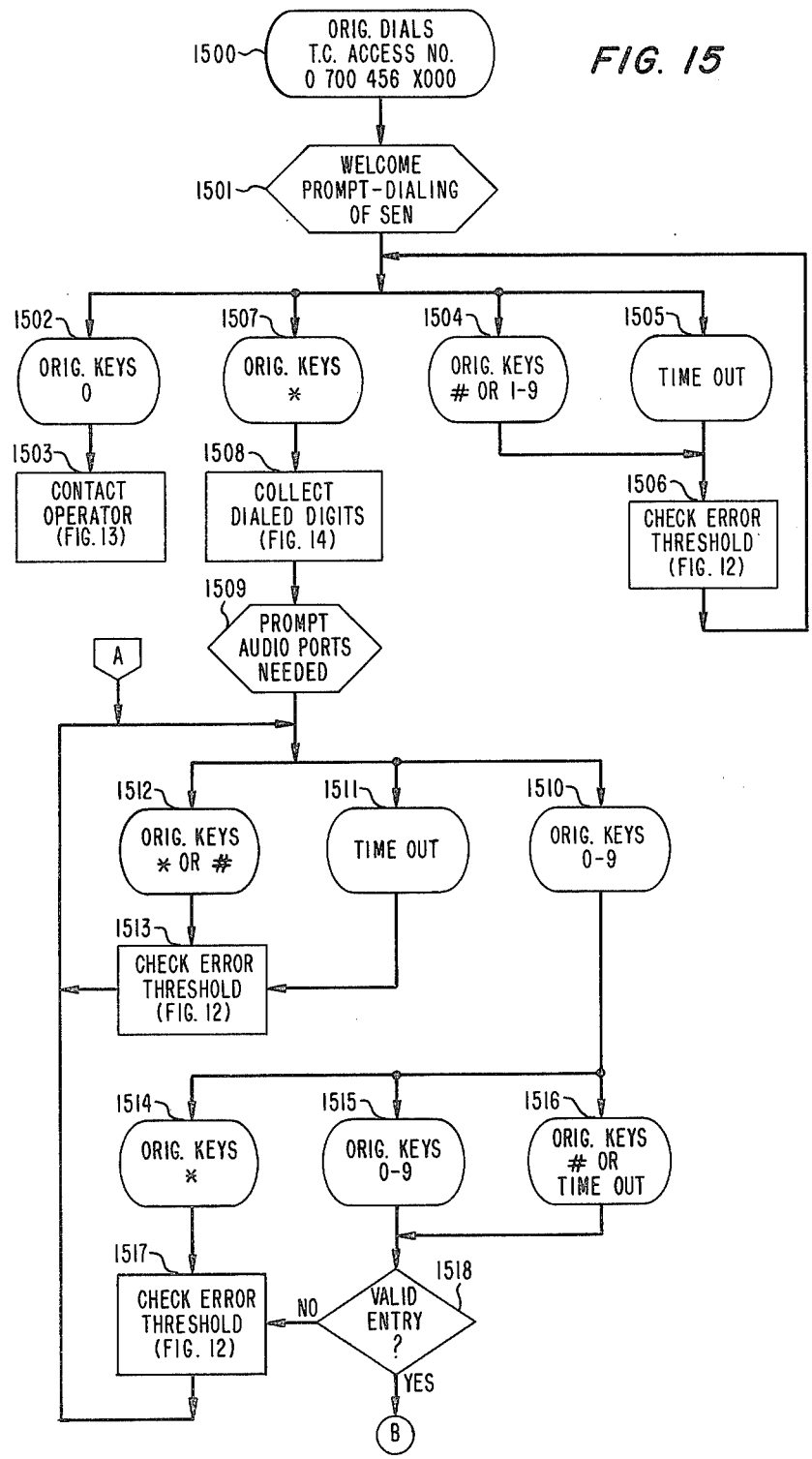
Figure 16:
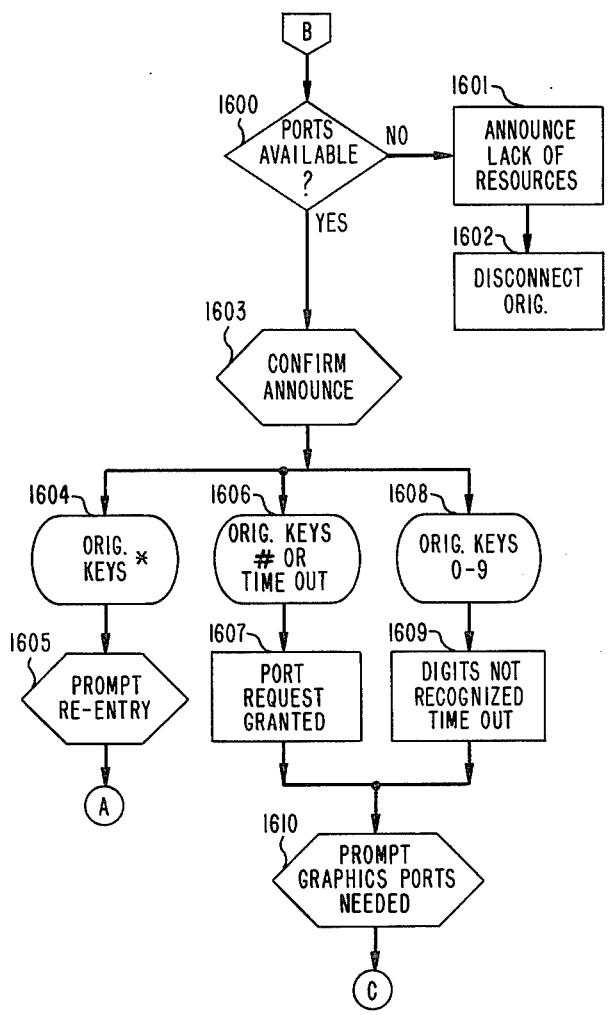
Figure 17:
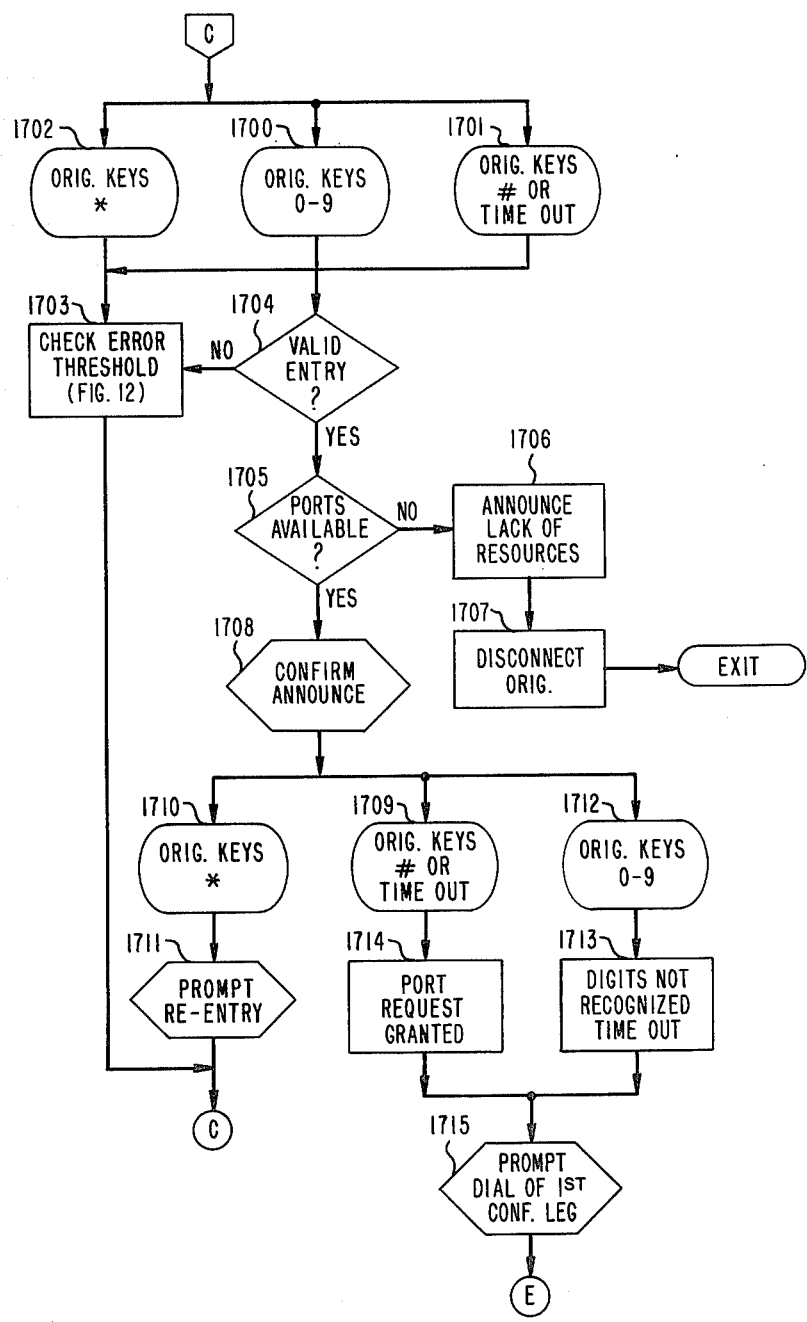
Figure 18:
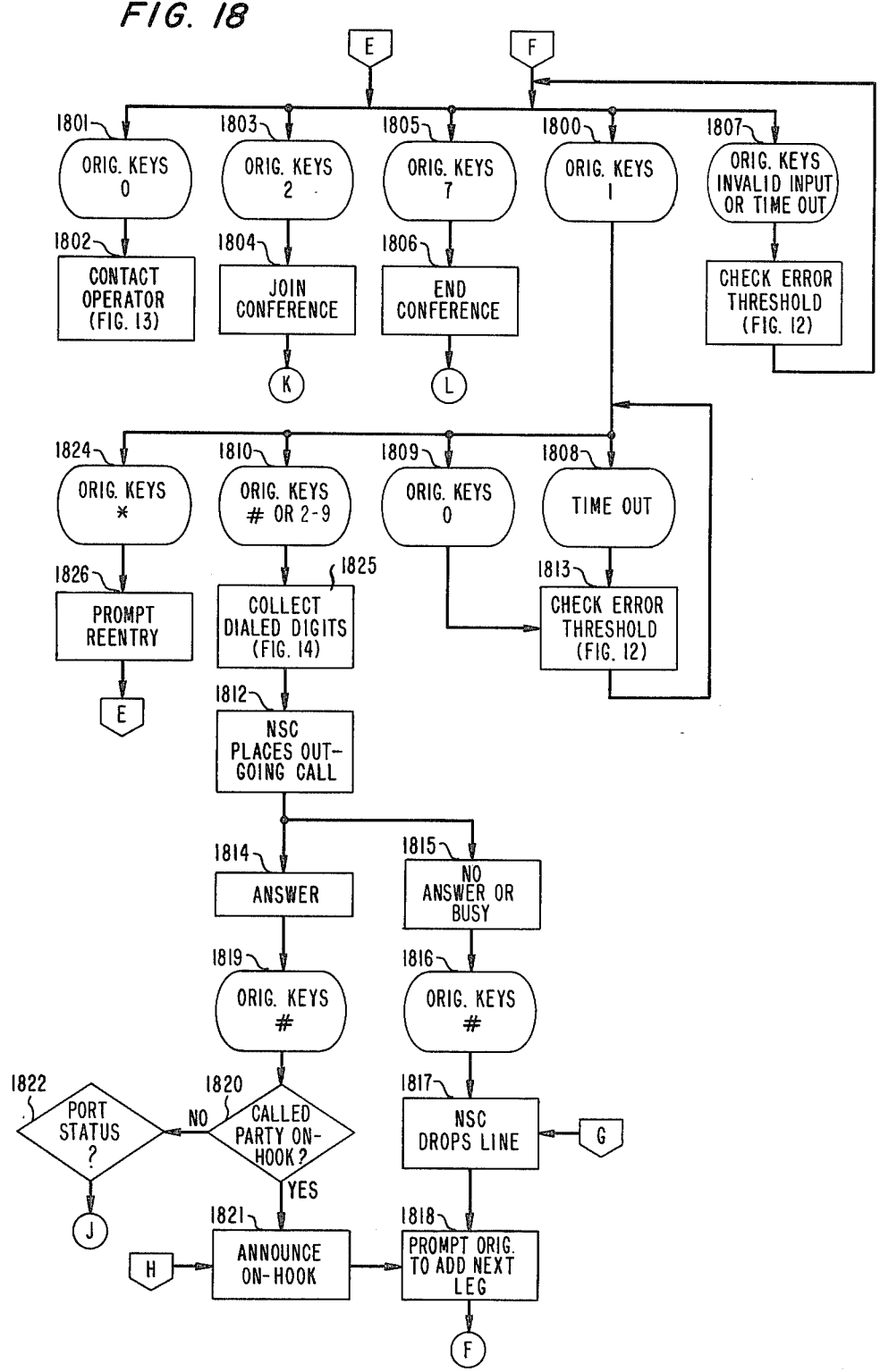
Figure 19:
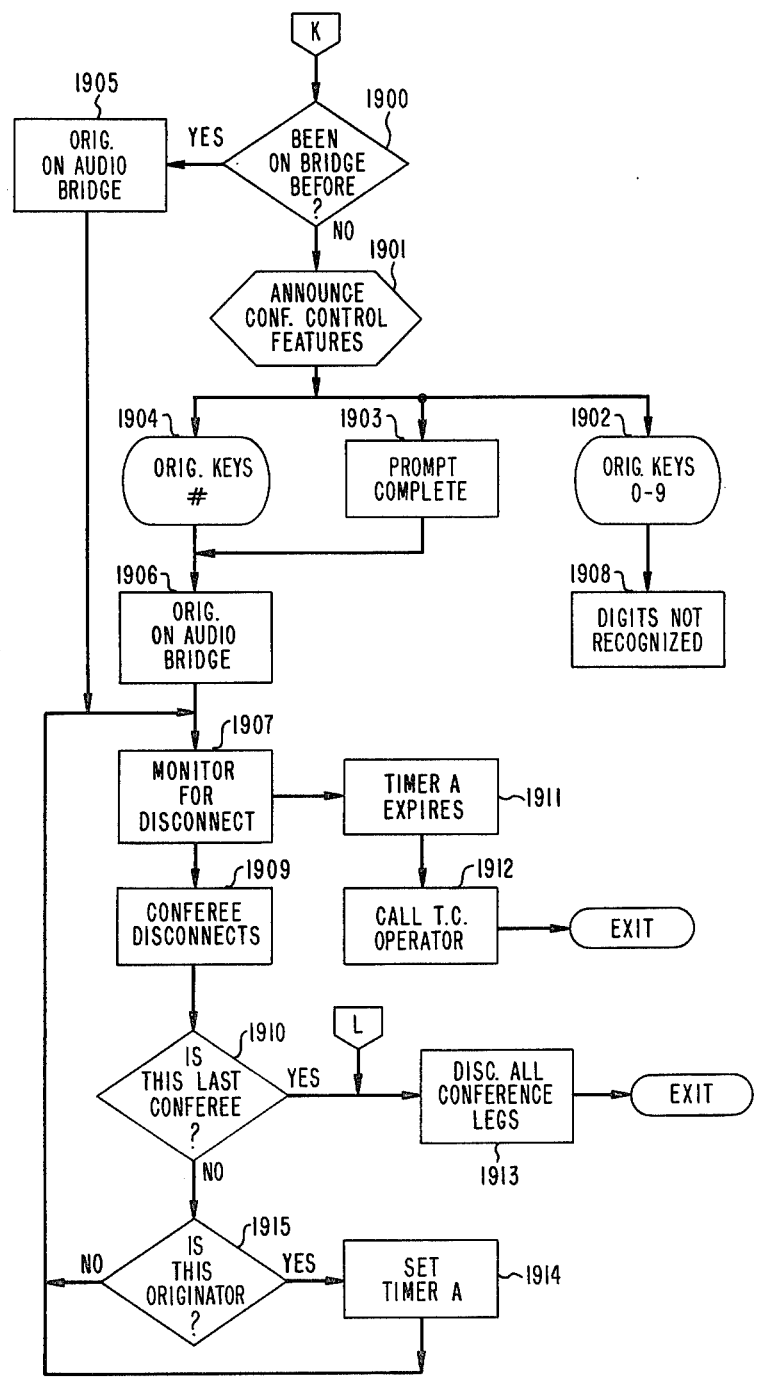
Figure 20:
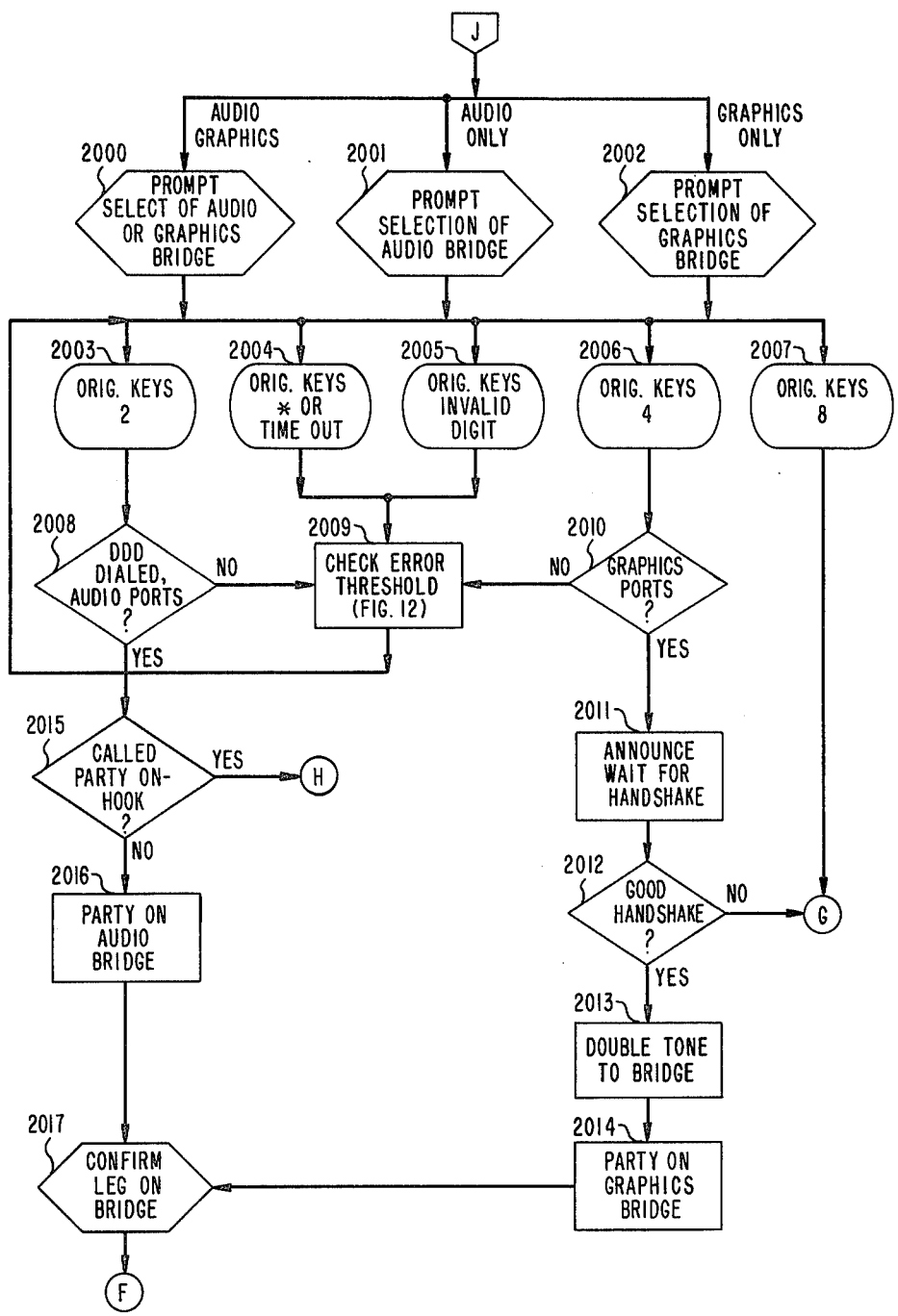

The conference originator begins by dialing into his/her local office a conference service access code of 10 or 11 digits, such as 0+700+456+X000, as shown in box 1500 of FIG. 15. The first digit might be used to route the call through a switching facility which enables the automatic identification of the calling customer for billing purposes. The next three digits provide a uniform code which identifies all special services such as those to be provided by the network services complex on a nationwide basis so that all customers within a wide geographic area utilize the same code. In the example being described, the digits 700 are used. The fifth through seventh digits (such as, "456") identify all teleconferencing services and the last four digits indicate the particular conference services, such as audio-only, audio/data, the size of the conference required, etc. For purposes of illustration, let it be assumed that the customer wishes to originate an audio/data conference.

The call is routed via the telephone network in a conventional manner to a toll switching system having a network services complex, such as toll system 102 shown in FIG. 1. Switching system 102 selects an idle trunk in the T1 link 131 and sends an initial address message over link 132 to the network services complex indicating that conference equipment is desired. p In response to the initial address message, network services complex processor 101 ascertains if it has sufficient conference resources to provide the service. It does this by examining tables in RAM 1100 which lists all of the available facilities along with their busy/idle status. Upon determining that sufficient conference facilities are available, processor 101 sends a message to switching system 102 over link 132 indicating that it will accept the conference call and requesting that the calling line be identified. Answer supervision is also returned to the originator's office at this time. The incoming T1 trunk in link 131 which is serving the conference originator is then connected via time slot interchange 124 to a playback buffer in data store 125, and processor 101 orders the data store to transmit a welcoming message to the conference originator. Processor 101 also orders the interconnection of tone receiver 138 to the trunk incoming from the conference originator in order to receive further digits transmitted by the originator.

As mentioned above, time slot interchange 124 provides the interconnection between communication channels in link 131 and the time multiplex data bus 133. Thus, information received on any channel (i.e., time slot) in link 131 can be transmitted to any of the channels in the same link to provide a trunk-to-trunk connection. Similarly, information in any time slot of the time multiplex data bus can be transmitted back via another time slot on the time multiplex data bus to interconnect service circuits of the network services complex. An example of this would be connecting a playback buffer of the data store 125 to an audio bridge port to play an announcement over the conference bridge. Also, the information in any time slot of link 131 can be transmitted via a time slot of time multiplex data bus 133 so that customers can be connected to a tone receiver, playback buffer, conference port, etc. Furthermore, communications can be fanned out by time slot interchange 124 so that an announcement transmitted from a playback buffer in data store 125 can be selectively transmitted via several time slots in link 131 so that many customers may hear the announcement.

The systems involved in this invention are time division systems and when the terms trunk, conference port, conference leg, channel, and similar terms are used throughout the specification, it will be understood that in actuality, the reference is being made to a particular time slot in one of the time multiplex channels.

Returning now to a description of the operation of the system, when processor 101 interconnected the originator's incoming trunk with data store 125, it ordered time slot interchange 124 to connect the incoming trunk time slot in link 131 with a time slot in multiplex data bus 133 that is associated with a designated playback buffer in the data store. At the same time, an order was sent over serial control bus 134 to the data store causing a welcoming message designated by the order to be played to the conference originator as shown in box 1501.

The welcoming message would inform the originator that he/she has been connected to a conference service and request the originator to dial a service entry number (SEN) or a "0". Dialing a "0" as shown in box 1502 would summon an operator who would then act similar to a conference originator in setting up the conference desired by the calling customer. By dialing the service entry number, however, the customer indicates that he/she wishes to establish the conference under his or her control.

It is contemplated that different service entry numbers will be used to select various features of the system. For example, the customer may be familiar with the procedure of establishing a conference and require little or no prompting. As such, the customer would dial a service entry number denoting that abbreviated prompts can be given and that these prompts can be interrupted if the originator is familiar with the instruction and begins dialing new control information while the instruction is still being played.

In this illustrative embodiment, it is assumed that the service entry number is a three-digit code preceded by the star (*) sign such as "*267" or "*268" with the latter code indicating that the originator is experienced and only requires abbreviated prompts. If the customer dials a valid service entry number, the digits are collected as shown in boxes 1400-1405 in FIG. 14. As the customer uses his station keyset to dial the service entry number, tone receiver 138 collects the digits and forwards them over control bus 134 to NSC processor 101. Tone receiver 138 performs the digit and interdigit timing and functions similar to many well-known digit receivers used in telephony. Upon collecting all the digits, a return is made to the main flow diagram in FIG. 15 where the customer is prompted to dial a code indicating the number of audio ports dialed as shown in box 1509.

The system is designed to interact with the user by prompting the user with appropriate announcements. It is anticipated, however, that a customer may err when dialing in response to the instructions given by the announcement system. In accordance with a feature of the invention, the system is designed to keep track of the number of errors made by the conference originator. Thus, if a customer makes an error, he can be reprompted to take corrective action. If however, the customer makes a series of errors, the system will automatically summon an operator to assist the customer. For example, should the conference originator neglect to dial and the system detects that timing has elapsed or the originator dials the wrong service entry number as shown in boxes 1504 and 1505, processor 101 would determine if the originator had made any prior errors as shown in boxes 1200-1206 in FIG. 12. If the customer had made too many errors, an announcement would be played to the conference originator asking the originator to stand by while an operator is being summoned to assist him or her. The network services complex then originates a call over an idle T1 trunk in link 131 and the telephone network to operator position 137, and the operator is connected via the time slot interchange 124 to the T1 trunk serving the conference originator. The operator can now assume control of the call and proceed to establish the conference. By assuming control, the tone receiver 138 is connected via time slot interchange 124 to the time slot assigned to the trunk over which the operator was summoned so that the operator can dial instructions into the network services complex for setting up the conference. The conference originator can be connected to the bridge in the usual manner as any of the conferees and control of the bridge will be exercised by the operator.

If the threshold of errors had not been exceeded, the conference originator is told by an announcement that an error has been made and then prompted with a message asking the customer to redial. This occurs when processor 101 executes boxes 1200-1206 in FIG. 12 and sends the appropriate orders to data store 125.

If the conference originator dials the correct service entry number, the NSC processor 101 sends an order to data store 125 to have a prompt played to the originator. This prompt will ask the originator to dial the number of ports needed for the conference.

The digits dialed by the originator are collected by tone receiver 138 and forwarded to NSC processor 101 where the processor ascertains if they are valid.

At this point in the operation, only the digits 0-9 represent a valid code and as many as 60 audio ports can be assigned to a single conference. If a star (*) or pound or number (#) sign are dialed or the customer does not dial (i.e., time-out), the processor treats this an an error as shown in boxes 1512 and 1513 and would reprompt the originator to take corrective action if the threshold had not been exceeded. If the threshold has been exceeded, processor 101 would summon the operator as described above.

Assuming that the originator dials a one or two digit code representing the number of audio ports wanted for the conference, processor 101 consults its memory 1100 to ascertain if the number of ports requested are available. If sufficient ports are available as shown in box 1600, processor 101 commands data store 125 to transmit a confirmation announcement that a sufficient number of audio ports are available as shown in box 1603. If not enough ports are available, processor 101 orders the data store 125 to play back an announcement indicating this to the originator. The originator can abandon the conference and place the conference call at a later time. The originator now dials the pound (#) sign to reserve the audio ports. Processor 101 responds to the dialing of the pound (#) sign by marking the ports in memory as being assigned to this particular conference. If the originator neglected to dial the pound (#) sign, processor 101 would time the call and after a predetermined interval would enter the sequence of events for reserving the data ports as shown in box 1607 just as though the pound (#) sign was dialed. Similar action takes place if the originator dials a digit in the sequence 0-9, except that the digits are ignored.

If the originator dials a star (*) sign, the originator is prompted to redial as shown in box 1604, and a loop in the program sequence is made until the originator dials the correct port selection code for the number of available ports or hangs up. By dialing the star (*) sign, the originator has the opportunity to change his mind and select a different number of ports before the ports are reserved as described above.

Let it be assumed, that the conference originator dialed the code for the number of audio ports desired followed by the pound (#) sign. Upon receiving this, NSC processor 101 transmits an order to data store 125 to have the appropriate announcement played to the originator for assisting the customer in establishing the data portion of the conference. In this case, the announcement requests the conference originator to dial a code indicating the number of data ports to be reserved as shown in box 1610.

In the case of a data conference, 64 ports are available and upon receiving a code representing the number of ports that the originator desires (box 1700), processor 101 examines a table in memory 1100 to ascertain if that number of data ports are available. If there are sufficient data ports available, they are reserved for this conference by processor 101 and processor 101 transmits an order to data store 125 to have a confirmation announcement sent to the originator as shown in box 1705.

The sequence of operation with respect to reserving data ports if sufficient data ports are available is similar to the sequence of operations described above with respect to the reservation of the audio bridge ports. This is set forth in FIG. 17 but need not be further described for a complete understanding of the invention.

The NSC processor 101 will now order data store 125 to play an announcement to the originator requesting that the originator dial the directory number assigned to the telephone station of the first audio conferee as shown in box 1715. In this illustrative embodiment, the directory number for an audio conferee takes the form 1-NPA-NXX-XXXX where the one prefix indicates that this is a conferee to be added to the bridge, and the NPA is the three-digit area code while the NXX-XXXX are the three-digit office code and telephone number of the conferee. The directory number assigned to data terminals in this embodiment takes a distinctive form and is preceded by the pound (#) sign and the digits 9988. Examples of typical directory numbers assigned to telephone stations and data terminals are shown in FIG. 1.

It will be noted that each conferee directory number is preceded by the digit 1. This permits the other digits on the station dial (i.e., keyset) to be used for control signals as will be described below.

Let it be assumed that the originator dials the prefix 1 as shown in box 1800 followed by the ten-digit code (boxes 1810-1811) of the first audio conferee. Since the tone receiver 138 is still connected to the conference originator, these digits are collected by the tone receiver and forwarded to processor 101. The NSC processor 101 records the number dialed by the originator and associates it in its memory with the particular conference for future use and now transmits a service request via CCIS terminal 126 and link 132 to toll switching system 102. In addition, processor 101 selects an idle trunk (i.e., time slot) in T1 link 131 to the toll switching system. The directory number of the called conferee is forwarded over the link 132 (box 1812) and toll switching system 102 responds by originating a call over the network to the called conferee station in a well-known manner.

When the conferee answers (box 1814), the trunk that the conference originator is using is connected via time slot interchange 124 to the trunk that was used to summon the conferee. In this mode, the originator can converse privately with the conferee and inform him/her that a conference call is in progress and that he/she is to be added to the bridge. The originator now depresses the pound (#) button on his keyset to add the conferee to the bridge.

Before adding the conferee, processor 101 interrogates its memory to ascertain what type of conference is to be set up (box 1822). As will be recalled, the conference originator can elect to establish an audio-only, a data-only, or a combined audio/data conference. The processor must now take steps to assure that if a audio conferee was designated by the originator, that the audio conferee is not added to a data conference or that a data conferee is not added to an audio conference.

Thus, in the example being described, the processor 101 ascertains that this is a combined audio/data conference and NSC processor 101 sends an order to the data store 125 requesting that the originator be prompted (box 2000, FIG. 20) with an announcement as to what keys to depress to add the conferee to the appropriate bridge or disconnect the conferee completely.

In the example being described, the originator will transmit the digit 8 (box 2007) if he/she wanted to release the conferee, transmit the digit 2 (box 2003) if he wanted to add the conferee to the audio bridge and transmit the digit 4 (box 2006) to add the conferee to the data bridge. If it is assumed that the conferee is an audio conferee and the originator transmits the digit 2 as shown in box 2003, then processor 101 verifies from its memory that the called conferee is an audio customer (box 2008) and that the conferee has not disconnected before the conferee is added to the bridge.

In response to the digit 2 being transmitted by the conference originator, processor 101 selects an idle audio port from its memory which contains an indication of the status of all ports and sends an order to time slot interchange 124 to interconnect the trunk over which the conferee was called with the selected port. In addition, processor 101 sends an order to audio bridge 128 via control bus 134 identifying the conference and the leg or port to be added to the conference.

The NSC processor 101 now orders the data store to deliver another prompt to the originator. This prompt informs the originator that the conferee has been added to the bridge and requests the originator to dial the next conferee or to depress the 2 button so that the originator may be added to the conference bridge.

The conference originator continues by dialing the numbers assigned to the remaining conferees until all conferees have been connected to the audio bridge.

If the originator had dialed the directory number associated with a data terminal and wishes to add this terminal to the data bridge, the originator keys the digit 4 as shown in box 2006. The processor 101 then verifies that this is a data station and instructs data bridge 135 to add the data port to a particular bridge. This is accomplished in a manner similar to the action described above with respect to the addition of a conferee to an audio bridge, namely, the processor 101 sends orders to the data bridge indicating the conference number and the port to be added. Processor 101 also orders data store 125 to play back an announcement requesting the originator to wait for an answer from the data terminal. The data bridge exchanges supervisory signals with the called data terminal (sometimes referred to as a "handshake") and reports back to the processor 101 that the port has been added. Processor 101 then transmits an order over bus 134 to data store 125 so the data store can announce (box 2017) to the conference originator that the data terminal he/she has requested has been added to the data bridge.

The sequence of events described above with respect to adding both audio stations and data terminals to the conference bridges is repeated until all conferees have been added. When the originator is ready to join the conference, the originator depresses the "2" button on his keyset.

Recognizing the digit "2" processor 101 ascertains if the originator had been on the conference before (box 1900). If not, processor 101 orders data store 125 to play back an announcement (box 1901) to the originator prompting the originator of the various options and control features that are available with the conference service. The conference is now in a stable state and the audio conferees can converse with each other and exchange data via their data sets. Supervision of the various conference legs is monitored by the toll switching system 102 for a disconnect (box 1907). Should any of the parties disconnect, processor 101 receives a message over link 132 informing the processor of the disconnect. The processor then begins timing the conference to determine if this is a valid disconnect. If all conferees disconnect (boxes 1910 and 1913) within the time interval, processor 101 orders the data bridge processor and audio bridge processor to disconnect the legs of the respective bridges so they may be available for other conferences. If all conferees have not disconnected within the time interval and the originator has disconnected, the teleconferencing operator is summoned as shown in box 1912 and FIG. 13.

In summary, a conference arrangement has been disclosed wherein customers establish audio-only, data-only and combined audio/data conferences under the guidance of machine announcements.

It is to be understood that the arrangements described herein are merely illustrative of the applications of the principles of the invention and that numerous other arrangements may be devised by those skilled in the art without departing from the spirit and scope of the invention.

What is claimed is:

1. For use in a communications network serving a plurality of customer stations, a conference arrangement comprising:
    a main processor system coupled to said network and having a control and data bus system;
    an audio conference system having a plurality of audio channels coupled to said bus system;
    a data conference system having a plurality of data channels separate from said audio channels and coupled to said bus system; and
    a data store system having a plurality of announcement channels separate from said audio and data channels and coupled to said bus system;
    said main processor system including means responsive to a service request signal over said network from a calling one of said customer stations for temporarily coupling one of said announcement channels to said calling station to request the customer thereat to transmit predetermined control signals to said main processor system; and
    means responsive to control signals received from said calling station for ordering the establishment of communication paths between certain ones of said audio and data channels as selected by said control signals and called ones of said stations as designated in accordance with said control signals.

2. The invention set forth in claim 1 wherein means are provided for ascertaining when said received control signals differ from said predetermined control signals; and
    means responsive to said ascertaining means for recoupling one of said announcement channels to said calling station to advise the customer thereat that said predetermined control signals were not received.

3. For use in a communications network serving a plurality of customer stations, a conference arrangement comprising:
    a main processor system coupled to said network and having a control and data bus system;
    an audio conference system having a plurality of audio channels coupled to said bus system;
    a data conference system having a plurality of data channels coupled to said bus system; and
    a data store system having a plurality of announcement channels coupled to said bus system;
    said main processor system including means responsive to a service request signal over said network from a calling one of said customer stations for temporarily coupling one of said announcement channels to said calling station to request the customer thereat to transmit predetermined control signals to said main processor system,
    means responsive to said predetermined control signals received from said calling station for ordering the establishment of communication paths between selected ones of said audio and data channels and called ones of said stations as designated in accordance with said predetermined control signals,
    means for ascertaining when any said received control signals differ from said predetermined control signals,
    means responsive to said ascertaining means for recoupling one of said announcement channels to said calling station to advise the customer thereat that said predetermined control signals were not received,
    means for recording the number of times control signals other than said predetermined control signals are received, and
    means controlled by said recording means for coupling said calling station with an operator position.

4. For use in a communication system serving a plurality of customer stations including audio stations and data stations and a network for establishing communications channels between said stations and a conference arrangement, a method for establishing a conference among selected ones of said stations each having a directory number assigned thereto comprising the steps of:
    announcing to a calling customer that the calling customer has been connected to the conference arrangement in response to a request by the calling customer for conference service;
    informing the calling customer of a plurality of first codes to dial in order to select one type of conference from the group including audio-only, data-only and audio/data conferences;
    in response to the receipt of one of said first codes, informing the calling customer to dial the directory number assigned to each conferee station to be added to the conference identified by the received first code;
    storing each directory number dialed by the calling customer;
    requesting said communication system to establish a communication channel to the conferee station identified by each directory number; and
    coupling together only the established communication channels associated with the same first code.

5. For use in a communication system serving a plurality of customer stations including audio stations and data stations and a network for establishing communication channels between said stations and a multiport conference arrangement, a method for establishing a conference among selected ones of said stations each having a directory number assigned thereto comprising the steps of:
    announcing to a calling customer that the calling customer has been connected to the multiport conference arrangement in response to a request by the calling customer for conference service;

informing the calling customer of a plurality of first codes to dial in order to select one type of conference from the group including audio-only, data-only and audio/data conferences;

in response to the receipt of one of said first codes, requesting the calling customer to dial a port selection code to designate the quantity of ports required for the conference and informing the calling customer to dial the directory number assigned to each conferee station to be added to the conference identified by the received first code;

storing each directory number dialed by the calling customer;

requesting said communication system to establish a communication channel to the conferee station identified by each directory number; and coupling together only the established communication channels associated with the same first code.

6. The invention set forth in claim 5 wherein the method further comprises the steps of ascertaining if the quantity of conference ports is available as designated by the selection code dialed by the calling customer and informing the customer that the quantity of ports has been reserved.

7. The invention set forth in claim 4 wherein the directory numbers associated with data stations have a code distinct from directory numbers associated with audio stations; and wherein the step of coupling together the communication channels associated with the same first code includes only coupling together audio stations and only coupling together data stations as determined by said distinct code.

8. The invention set forth in claim 4 wherein the step of coupling the communication channels includes the steps of first coupling each conferee to the calling customer individually prior to coupling the communication channels of called conferees together.

9. For use in a communications network serving a plurality of customer stations, a conference arrangement comprising:

a main processor system coupled to said network and having a control and data bus system;

a conference system having a plurality of conference channels coupled to said bus system;

a data store system having a plurality of announcement channels coupled to said bus system;

said main processor system including means responsive to a service request signal over said network from a calling one of said customer stations for coupling one of said announcement channels to said calling station to request the customer thereat to transmit predetermined control signals to said main processor system; and means responsive to control signals received from said calling station for ordering the establishment of communication paths between certain ones of said conference channels as selected by said control signals and called ones of said stations as designated in accordance with said control signals.

10. The invention set forth in claim 9 wherein said bus system comprises a time division multiplex data bus and a control bus;

wherein said channels comprise individual time slots on said time multiplex data bus;

wherein said coupling means comprises time-slot interchange means controlled by said main processor system and interposed between said network and said time multiplex data bus; and wherein said ordering means comprises processor means associated with said conference system and responsive to orders over said control bus from said main processor system for activating the selected conference channels on said time multiplex data bus.

* * * * *